United States Patent
Keller

(10) Patent No.: US 11,446,609 B2
(45) Date of Patent: Sep. 20, 2022

(54) SYSTEMS AND METHODS FOR CONCENTRATING FLUID COMPONENTS VIA DISTILLATION AND MEMBRANE FILTRATION

(71) Applicant: Via Separations, Inc., Somerville, MA (US)

(72) Inventor: Brent Keller, Somerville, MA (US)

(73) Assignee: Via Separations, Inc., Somerville, MA (US)

(*) Notice: Subject to any disclaimer, the term of this patent is extended or adjusted under 35 U.S.C. 154(b) by 0 days.

(21) Appl. No.: 16/567,423

(22) Filed: Sep. 11, 2019

(65) Prior Publication Data

US 2020/0078735 A1     Mar. 12, 2020

Related U.S. Application Data

(60) Provisional application No. 62/729,697, filed on Sep. 11, 2018.

(51) Int. Cl.
| | | |
|---|---|---|
| *B01D 61/36* | (2006.01) | |
| *B01D 3/36* | (2006.01) | |
| *B01D 71/02* | (2006.01) | |

(52) U.S. Cl.
CPC .......... *B01D 61/364* (2013.01); *B01D 3/36* (2013.01); *B01D 71/024* (2013.01)

(58) Field of Classification Search
CPC ...... B01D 61/364; B01D 3/36; B01D 71/024; B01D 2311/04; B01D 2311/06;
(Continued)

(56) References Cited

U.S. PATENT DOCUMENTS

| | | | |
|---|---|---|---|
| 2009/0008235 A1* | 1/2009 | Goel .............. | B01D 3/002 203/41 |
| 2011/0130598 A1* | 6/2011 | Huang .............. | B01D 3/14 568/917 |

(Continued)

FOREIGN PATENT DOCUMENTS

CN          104874301 A      9/2015

OTHER PUBLICATIONS

Gravelle, S. et al., "Carbon membranes for efficient water-ethanol separation," arxiv.org, Cornell University Library, Online Library, Cornell University, Sep. 7, 2016, 8 pages; doi:10.1063/1.4963098.

(Continued)

*Primary Examiner* — Krishnan S Menon
(74) *Attorney, Agent, or Firm* — Cooley LLP

(57) ABSTRACT

Embodiments described herein relate generally to systems, apparatus, and methods for using graphene oxide-containing membranes for separation and concentration processes. In some embodiments, a fluid component having a first concentration in a fluid mixture can be concentrated using a first distillation process to a second concentration. In some embodiments, the fluid component can be concentrated from the second concentration to a third concentration using a graphene oxide-containing membrane. In some embodiments, the fluid component can be concentrated from the third concentration to a fourth concentration using a second distillation process. In some embodiments, the fluid component can have an azeotropic concentration between the second concentration and the third concentration.

10 Claims, 14 Drawing Sheets

(58) Field of Classification Search
CPC ............ B01D 2311/08; B01D 2311/25; B01D 2311/2669; B01D 71/021; B01D 61/025
See application file for complete search history.

(56) References Cited

U.S. PATENT DOCUMENTS

| | | | |
|---|---|---|---|
| 2015/0224420 A1* | 8/2015 | Hickey | B01D 3/145 203/41 |
| 2016/0107964 A1* | 4/2016 | Matsukata | B01D 3/145 568/913 |
| 2017/0174537 A1 | 6/2017 | Zheng et al. | |
| 2017/0341034 A1 | 11/2017 | Dave et al. | |

OTHER PUBLICATIONS

Liu, R. et al., "Graphene oxide membrane for liquid phase organic molecular separation," Carbon, 77:933-938 (2014).

* cited by examiner

SYSTEMS AND METHODS FOR CONCENTRATING FLUID COMPONENTS VIA DISTILLATION AND MEMBRANE FILTRATION

RELATED APPLICATIONS

This application claims priority to and the benefit of U.S. Provisional Patent Application No. 62/729,697, filed on Sep. 11, 2018, the disclosure of which is hereby incorporated by reference in its entirety.

TECHNICAL FIELD

The present disclosure relates generally to systems, apparatus, and methods for using membranes, e.g., graphene oxide-containing membranes, and distillation systems for separation and concentration processes.

BACKGROUND

Distillation is commonly used to concentrate a fluid component in a fluid mixture. However, in some situations such as methanol purification, distillation can become prohibitively energy intensive when one attempts to increase the concentration of methanol from, e.g., 90 mol % to close to 100 mol % in a methanol-water mixture.

In other situations involving azeotropes, distillation alone is not capable of increasing the concentration of a fluid component in a fluid mixture. An azeotrope or a constant boiling point mixture is a mixture of two or more fluids whose proportions cannot be altered or changed by simple distillation. A well-known example of an azeotrope is a mixture having 95.63 wt % ethanol and 4.37 wt % water. This means that there is no separation possible between the two or more fluids without a means of breaking the azeotrope. One common method to break an azeotrope is called azeotropic distillation, which includes adding a material separation agent to the azeotrope, such as benzene to an ethanol/water mixture, which changes the molecular interactions and eliminates the azeotrope. After adding the material separation agent, the method further includes a distillation step to alter the proportions of the two or more fluids and recover the material separation agent.

Material separation agents may be expensive or may not exist for some azeotropes. Moreover, additional capital infrastructure and expense are needed to remove the material separation agents.

SUMMARY

Embodiments described herein relate generally to systems, apparatus, and methods for using membranes, e.g., graphene oxide-containing membranes, and distillation systems for separation and concentration processes.

In one aspect, the present disclosure provides a method of breaking an azeotrope comprising a first fluid component and a second fluid component, the azeotrope being characterized by an azeotropic concentration of the first fluid component, wherein the method comprises: feeding a first fluid mixture through a membrane system comprising at least two graphene oxide-containing membranes, the first fluid mixture comprising the first fluid component at a first concentration and the second fluid component, wherein the first concentration is about 0.1 mol % to about 10 mol % less than the azeotropic concentration, whereby feeding the first fluid mixture through the membrane system produces a second fluid mixture having a second concentration of the first fluid component greater than the azeotropic concentration.

In some embodiments, the second concentration is about 0.1 mol % to about 10 mol % greater than the azeotropic concentration.

In some embodiments, each graphene oxide-containing membrane experiences an osmotic pressure of less than 1,000 psi. In some embodiments, the osmotic pressure is at least 100 psi.

In some embodiments, the second fluid component preferentially passes through each graphene oxide-containing membrane as compared to the first fluid component and the second fluid mixture is produced on a concentrate side of each graphene oxide-containing membrane.

In some embodiments where the second fluid component preferentially passes through each membrane, each membrane has a rejection rate for the first fluid component of not more than r1 or r2, whichever is less, as calculated by:

$$r1 = 1 - \left(1 - \frac{\gamma_c x_c}{\gamma_{p,final} \exp\left(\frac{-RT}{P_{max} \overline{V}}\right)}\right) \Big/ (1 - \gamma_c x_c), \quad \text{(Equation I)}$$

and $$r2 = 1 - \left(1 - \frac{\gamma_f x_f}{\gamma_{p,initial} \exp\left(\frac{-RT}{P_{max} \overline{V}}\right)}\right) \Big/ (1 - \gamma_f x_f), \quad \text{(Equation II)}$$

wherein:

c denotes the concentrate side of each membrane;

p denotes a permeate side of each membrane;

$\overline{V}$ is the partial molar volume of the second fluid component on the permeate side of each membrane;

$\gamma_{p,\,initial}$ is the activity coefficient of the second fluid component on the permeate side when the feed (i.e., the first fluid mixture) first enters the membrane system;

$\gamma_{p,\,final}$ is the activity coefficient of the second fluid component on the permeate side when the concentrate (i.e., the second fluid mixture) exits the membrane system;

$\gamma_c$ is the activity coefficient of the second fluid component in the second fluid mixture;

$\gamma_f$ is the activity coefficient of the second fluid component in the first fluid mixture;

$x_c$ is the molar fraction of the second fluid component in the second fluid mixture;

$x_f$ is the molar fraction of the second fluid component in the first fluid mixture;

R is the ideal gas constant;

T is temperature; and $P_{max}$ is the maximum practical osmotic pressure.

In some embodiments, the first fluid component preferentially passes through each graphene oxide-containing membrane as compared to the second fluid component, and the second fluid mixture is produced on a permeate side of each graphene oxide-containing membrane.

In some embodiments where the first fluid component preferentially passes through each membrane, a third fluid mixture is produced on a concentrate side of each membrane, and each membrane has a rejection rate for the second fluid component of not more than r1 or r2, whichever is less, as calculated by:

$$r1 = 1 - \left(1 - \frac{\gamma_c x_c}{\gamma_{p,final} \exp\left(\frac{-RT}{P_{max}\overline{V}}\right)}\right) \bigg/ (1 - \gamma_c x_c), \quad \text{(Equation III)}$$

and $$r2 = 1 - \left(1 - \frac{\gamma_f x_f}{\gamma_{p,initial} \exp\left(\frac{-RT}{P_{max}\overline{V}}\right)}\right) \bigg/ (1 - \gamma_f x_f), \quad \text{(Equation IV)}$$

wherein:

c denotes the concentrate side of each membrane;

p denotes the permeate side of each membrane;

$\overline{V}$ is the partial molar volume of the first fluid component on the permeate side of each membrane;

$\gamma_{p,\,initial}$ is the activity coefficient of the first fluid component on the permeate side when the feed (i.e., the first fluid mixture) first enters the membrane system;

$\gamma_{p,\,final}$ is the activity coefficient of the first fluid component on the permeate side when the concentrate (i.e., the third fluid mixture) exits the membrane system;

$\gamma_c$ is the activity coefficient of the first fluid component in the third fluid mixture;

$\gamma_f$ is the activity coefficient of the first fluid component in the first fluid mixture;

$x_c$ is the molar fraction of the first fluid component in the third fluid mixture;

$x_f$ is the molar fraction of the first fluid component in the first fluid mixture;

R is the ideal gas constant;

T is temperature; and $P_{max}$ is the maximum practical osmotic pressure.

In some embodiments, each of the at least two graphene oxide-containing membranes comprises a plurality of graphene oxide sheets. Each of the graphene oxide sheets can be coupled to an adjacent graphene oxide sheet via a chemical linker.

In some embodiments, the membrane system further comprises a support substrate in contact with each graphene oxide-containing membrane.

In some embodiments, the support substrate includes a material selected from polypropylene, polystyrene, polyethylene, polyethylene oxide, polyethersulfone, polytetrafluoroethylene, polyvinylidene fluoride, polymethylmethacrylate, polydimethylsiloxane, polyester, cellulose, cellulose acetate, cellulose nitrate, polyacrylonitrile, glass fiber, quartz, alumina, silver, polycarbonate, nylon, Kevlar or other aramid, or polyether ether ketone.

In some embodiments, the at least two graphene oxide-containing membranes are parallel or substantially parallel to each other. In some embodiments, the membranes can be in the form of a spiral wound module.

In some embodiments, each graphene oxide-containing membrane is in the form of a tube having a hollow core, the first fluid mixture being fed through the hollow core. The tube can be a tubular membrane module.

In some embodiments, the first fluid mixture comprises three fluid components.

In some embodiments, the first fluid mixture comprises hydrochloric acid and water, the hydrochloric acid being the first fluid component. In some embodiments, the first fluid mixture consists essentially of hydrochloric acid and water. In some embodiments, each of the at least two graphene oxide-containing membranes has a rejection rate of not more than about 10% for the hydrochloric acid.

In some embodiments, the first fluid mixture comprises ethanol and water, the ethanol being the first fluid component. In some embodiments, the first fluid mixture consists essentially of ethanol and water.

In some embodiments, the first fluid mixture comprises propanol and water, the propanol being the first fluid component. In some embodiments, the first fluid mixture consists essentially of propanol and water.

In some embodiments, the first fluid mixture comprises nitric acid and water, the nitric acid being the first fluid component. In some embodiments, the first fluid mixture consists essentially of nitric acid and water.

In some embodiments, the azeotrope and the first fluid mixture have the same fluid components.

In one aspect, the present disclosure provides a method of concentrating a first fluid component in a first fluid mixture, the first fluid mixture comprising the first fluid component at a first concentration and a second fluid component, wherein the method comprises: distilling the first fluid mixture through a first distillation column to produce a second fluid mixture having the first fluid component at a second concentration, the second concentration being greater than the first concentration and less than an azeotropic concentration of the first fluid component in the second fluid mixture, and feeding the second fluid mixture through a membrane system comprising at least two graphene oxide-containing membranes to produce a third fluid mixture having the first fluid component at a third concentration that is greater than the azeotropic concentration.

In some embodiments, the method further comprises distilling the third fluid mixture through a second distillation column to produce a fourth fluid mixture having the first fluid component at a fourth concentration that is greater than the third concentration.

In some embodiments, the third fluid mixture is produced on a concentrate side of each membrane, and the feeding step produces a fifth fluid mixture on a permeate side of each membrane, the fifth fluid mixture having the first fluid component at a fifth concentration that is less than the second concentration, the method further comprising distilling the fifth fluid mixture through the first distillation column.

In some embodiments, the third fluid mixture is produced on a permeate side of each membrane, and the feeding step produces a sixth fluid mixture on a concentrate side of each membrane, the sixth fluid mixture having the first fluid component at a sixth concentration that is less than the second concentration, the method further comprising distilling the sixth fluid mixture through the first distillation column.

In some embodiments, the second concentration is about 0.1 mol % to about 10 mol % less than the azeotropic concentration.

In some embodiments, the third concentration is about 0.1 mol % to about 10 mol % greater than the azeotropic concentration.

In some embodiments, each graphene oxide-containing membrane experiences an osmotic pressure of less than 1000 psi.

In some embodiments, the second fluid mixture is fed through the membrane system without being cooled.

In one aspect, the present disclosure provides a method of concentrating a first fluid component in a first fluid mixture, the first fluid mixture comprising the first fluid component at a first concentration and a second fluid component, wherein the method comprises: distilling the first fluid mixture through a first distillation column to produce a second fluid mixture having the first fluid component at a second concentration, the second concentration being greater than the first concentration and is at least 90 mol %, and feeding the second fluid mixture through a membrane system comprising at least two graphene oxide-containing membranes to produce a third fluid mixture having the first fluid component at a third concentration that is greater than the second concentration.

In some embodiments, the third fluid mixture is produced on a permeate side of each membrane.

In some embodiments, the third concentration is at least 95 mol %.

In some embodiments, the third concentration is at least 99 mol %.

In some embodiments, the feeding step produces a fourth fluid mixture on a concentrate side of each membrane, the fourth fluid mixture having the first fluid component at a fourth concentration that is less than the second concentration, the method further comprising distilling the fourth fluid mixture through the first distillation column.

In some embodiments, each graphene oxide-containing membrane experiences an osmotic pressure of less than 1000 psi.

In some embodiments, each of the at least two graphene oxide-containing membranes has a rejection rate for the second fluid component of not more than r1 or r2, whichever is less, as calculated by:

$$r1 = 1 - \left(1 - \frac{\gamma_c x_c}{\gamma_{p,final} \exp\left(\frac{-RT}{P_{max}\overline{V}}\right)}\right) \Big/ (1 - \gamma_c x_c), \quad \text{(Equation V)}$$

and $$r2 = 1 - \left(1 - \frac{\gamma_f x_f}{\gamma_{p,initial} \exp\left(\frac{-RT}{P_{max}\overline{V}}\right)}\right) \Big/ (1 - \gamma_f x_f), \quad \text{(Equation VI)}$$

wherein:
c denotes the concentrate side of each membrane;
p denotes the permeate side of each membrane;
$\overline{V}$ is the partial molar volume of the first fluid component on the permeate side of each membrane;
$\gamma_{p,\ initial}$ is the activity coefficient of the first fluid component on the permeate side when the feed (i.e., the second fluid mixture) first enters the membrane system;
$\gamma_{p,\ final}$ is the activity coefficient of the first fluid component on the permeate side when the concentrate (i.e., the fourth fluid mixture) exits the membrane system;
$\gamma_c$ is the activity coefficient of the first fluid component in the fourth fluid mixture;
$\gamma_f$ is the activity coefficient of the first fluid component in the second fluid mixture;
$x_c$ is the molar fraction of the first fluid component in the fourth fluid mixture;
$x_f$ is the molar fraction of the first fluid component in the second fluid mixture;
R is the ideal gas constant;
T is temperature; and
$P_{max}$ is the maximum practical osmotic pressure.

In some embodiments, each of the at least two graphene oxide-containing membranes comprises a plurality of graphene oxide sheets.

In some embodiments, each of the graphene oxide sheets is coupled to an adjacent graphene oxide sheet via a chemical linker.

In some embodiments, the membrane system further comprises a support substrate in contact with each graphene oxide-containing membrane.

In some embodiments, the support substrate includes a material selected from polypropylene, polystyrene, polyethylene, polyethylene oxide, polyethersulfone, polytetrafluoroethylene, polyvinylidene fluoride, polymethylmethacrylate, polydimethylsiloxane, polyester, cellulose, cellulose acetate, cellulose nitrate, polyacrylonitrile, glass fiber, quartz, alumina, silver, polycarbonate, nylon, Kevlar or other aramid, or polyether ether ketone.

In some embodiments, the at least two graphene oxide-containing membranes are parallel or substantially parallel to each other. In some embodiments, the membranes can be in the form of a spiral wound module.

In some embodiments, each graphene oxide-containing membrane is in the form of a tube having a hollow core, the first fluid mixture being fed through the hollow core. The tube can be a tubular membrane module.

In some embodiments, the first fluid mixture comprises three fluid components.

In some embodiments, the first fluid mixture comprises methanol and water, methanol being the first fluid component. In some embodiments, the first fluid mixture consists essentially of methanol and water.

In some embodiments, the first fluid mixture comprises ethylene benzene, diethylbenzene, and benzene, ethylene benzene being the first fluid component.

In some embodiments, the first fluid mixture comprises styrene, ethyl benzene, benzene, and toluene, styrene being the first fluid component.

In some embodiments, the first fluid mixture comprises cumene hydroperoxide, cumene, phenol, and an organic acid, cumene hydroperoxide being the first fluid component.

In some embodiments, the first fluid mixture comprises acetic acid and water, the acetic acid being the first fluid component. In some embodiments, the first fluid mixture consists essentially of acetic acid and water.

In some embodiments, the second fluid mixture is fed through the membrane system without being cooled.

BRIEF DESCRIPTION OF THE DRAWINGS

FIG. 7A is a graph showing overall or mechanical pressure in pascals versus length along flow path in meters.

FIG. 7B is a graph showing flow rate of the fluid on the feed side of the membranes (m/s) and the flux (kg/m$^2$s) through the membrane.

FIG. 7C is a graph showing concentration of the three species along the membrane profile.

FIG. 10A is a graph showing overall or mechanical pressure in pascals versus length along flow path in meters.

FIG. 10B is a graph showing flow rate of the fluid on the feed side of the membranes (m/s) and the flux (kg/m$^2$s) through the membrane.

FIG. 10C is a graph showing concentration of the two species along the membrane profile.

DETAILED DESCRIPTION

The present disclosure provides, inter alia, systems, apparatus, and methods for breaking an azeotrope, and/or concentrating a fluid component in a fluid mixture, by using membranes, e.g., graphene oxide-containing membranes, and distillation systems.

Figure 2:
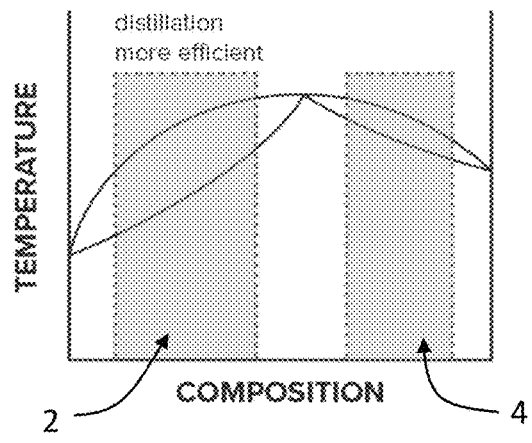
FIG. 2 is a two-component phase diagram and illustrates specifically the regions for which distillation processes are more efficient, according to some embodiments.
Figure 3:
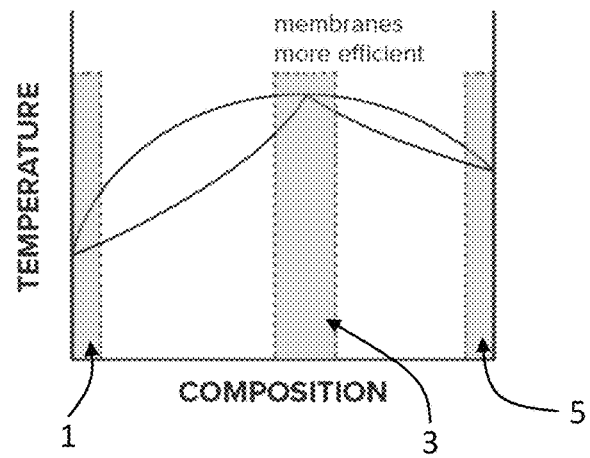
FIG. 3 illustrates the regions of the two-component phase diagram of FIG. 2 for which membrane separation processes are more efficient, according to some embodiments.

FIGS. 2 and 3 illustrate a two-component phase diagram for an example solution having a first fluid component and a second fluid component. The x-axes of FIGS. 2 and 3 are the molar ratio or weight ratio of the first fluid component. As shown in FIG. 2, the highlighted regions (regions 2 and 4) illustrate compositional regions for which distillation processes are more efficient for concentrating the first fluid component in the example solution than a membrane separation process. As shown in FIG. 3, the highlighted regions (regions 1, 3, and 5) illustrate compositional regions for which membrane separation processes are more efficient for further concentrating the first fluid component in the example solution than a distillation process. Specifically, in region 1, a membrane separation process can be used to increase the concentration of the first fluid component from a low level, e.g., 0.1 mol %; in region 3, a membrane separation process can be used to break the azeotrope; and in region 5, a membrane separation process can be used to increase the concentration of the first fluid component to close to 100 mol %.

Therefore, if a feed has an initial concentration within region 1 and a desired finished product has a concentration within region 5, the process for concentrating the feed to form the finished product can include three membrane processes and two distillation processes. If the feed has a concentration in region 2 and the desired finished product has a concentration in region 4, the process can include one membrane separation process and two distillation processes. If the feed has a concentration in region 3 and the desired finished product has a concentration in region 4, the process can include one membrane separation process and one distillation process. As shown in FIGS. 2 and 3, the azeotrope for the first fluid component in the solution can be located within region 3, meaning that a membrane process can be more efficient at overcoming the azeotrope than a distillation process. On the other hand, the bulk of feed concentration can be carried out by distillation in regions 2 and 4 of the phase diagram. In some embodiments, the process can include a single distillation process to increase the concentration to the boundary between regions 2 and 3 and a membrane separation process to overcome the azeotrope in region 3.

Figure 1:
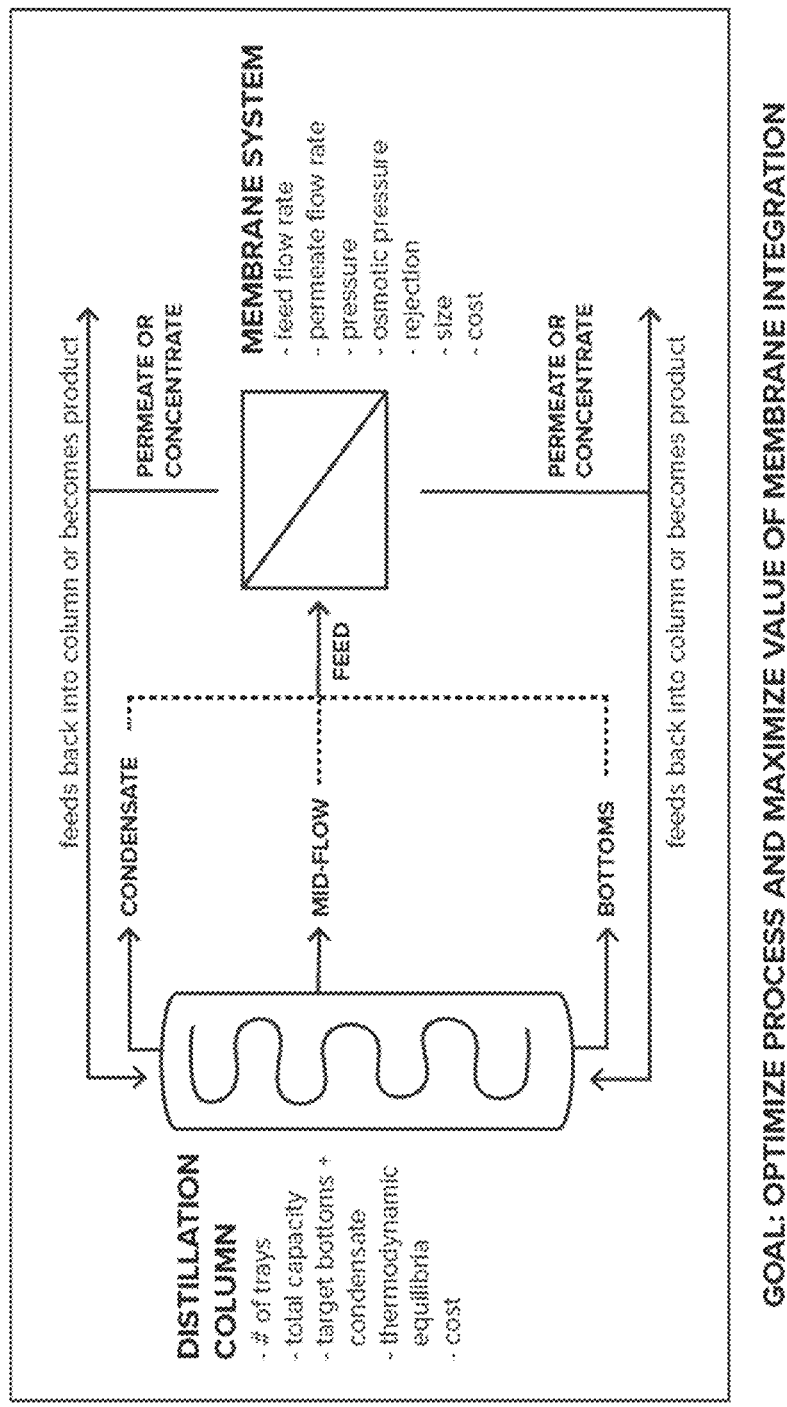
FIG. 1 is a schematic diagram showing a hybrid distillation and membrane separation process, according to some embodiments.

FIG. 1 illustrates a process for concentrating a fluid component in a fluid mixture and/or for the separation of the fluid component from the fluid mixture. In some embodiments, the process can include at least one distillation process and at least one membrane separation process. In some embodiments, the process can include a distillation column having a plurality of trays and being configured to separate a fluid mixture into at least two of a condensate stream, a mid-flow stream, and a bottoms stream. In some embodiments, at least one of the condensate stream, the mid-flow stream, and the bottoms stream can be fed into a membrane system. In some embodiments, the condensate stream can be communicated directly to either permeate or concentrate as a finished product, by-product, or waste-product. In some embodiments, the condensate stream can be communicated into the membrane system to further separate a molecular species (e.g., a first fluid component). In some embodiments, the mid-flow stream can be communicated into the membrane system to further remove a molecular species and can be communicated from the membrane system to either permeate or concentrate. In some embodiments, the bottoms stream from the distillation process can be communicated either through the membrane system and out to concentrate or directly out to waste. In some embodiments, the permeate and/or concentrate from the membrane system can be communicated to or back to the distillation process to further concentrate the molecular species in the fluid mixture or separate the molecular species from the fluid mixture.

In one aspect, the present disclosure provides a method of breaking an azeotrope comprising a first fluid component and a second fluid component, the azeotrope being characterized by an azeotropic concentration of the first fluid component, wherein the method comprises: feeding a first fluid mixture through a membrane system comprising at least two graphene oxide-containing membranes, the first fluid mixture comprising the first fluid component at a first concentration and the second fluid component, wherein the first concentration is about 0.1 mol % to about 10 mol % less than the azeotropic concentration, whereby feeding the first fluid mixture through the membrane system produces a second fluid mixture having a second concentration of the first fluid component greater than the azeotropic concentration.

In some embodiments, the first concentration can be about 0.1 mol %, about 0.5 mol %, about 1.0 mol %, about 1.5 mol %, about 2.0 mol %, about 2.5 mol %, about 3.0 mol %, about 3.5 mol %, about 4.0 mol %, about 4.5 mol %, about 5.0 mol %, about 5.5 mol %, about 6.0 mol %, about 6.5 mol %, about 7.0 mol %, about 7.5 mol %, about 8.0 mol %, about 8.5 mol %, about 9.0 mol %, about 9.5 mol %, or about 10.0 mol % less than the azeotropic concentration.

Combinations of the above-referenced numbers to provide ranges for the first concentration are also possible. For example, the first concentration can be about 0.1 mol % to about 10.0 mol %, about 0.1 mol % to about 9.0 mol %, about 1.0 mol % to about 10.0 mol %, or about 1.0 mol % to about 5.0 mol % less than the azeotropic concentration.

In some embodiments, the second concentration can be about 0.1 mol % to about 10 mol % greater than the azeotropic concentration. In some embodiments, the second concentration can be about 0.1 mol %, about 0.5 mol %, about 1.0 mol %, about 1.5 mol %, about 2.0 mol %, about 2.5 mol %, about 3.0 mol %, about 3.5 mol %, about 4.0 mol %, about 4.5 mol %, about 5.0 mol %, about 5.5 mol %, about 6.0 mol %, about 6.5 mol %, about 7.0 mol %, about 7.5 mol %, about 8.0 mol %, about 8.5 mol %, about 9.0 mol %, about 9.5 mol %, or about 10.0 mol % greater than the azeotropic concentration.

Combinations of the above-referenced numbers to provide ranges for the second concentration are also possible. For example, the second concentration can be about 0.1 mol % to about 10.0 mol %, about 0.1 mol % to about 9.0 mol %, about 1.0 mol % to about 10.0 mol %, or about 1.0 mol % to about 5.0 mol % greater than the azeotropic concentration.

Figure 4:
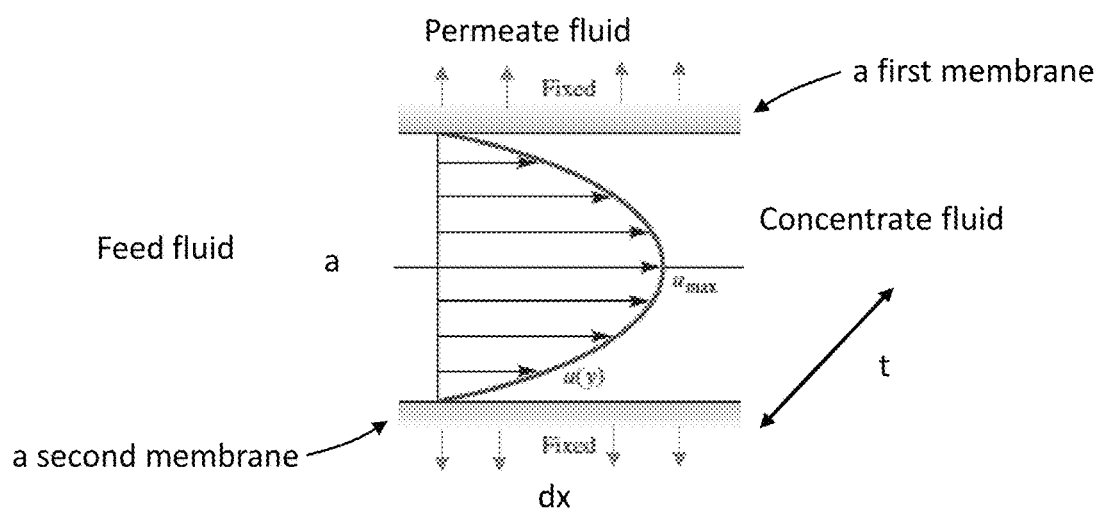
FIG. 4 is a schematic diagram modeling an arbitrarily-size membrane system using constant permeability (flux/(feed pressure−osmotic pressure difference)) for solution and rejection (ratio of permeate concentration to feed concentration at that point in membrane) for each species. Osmotic pressures are calculated using non-dilute ideal solution model.

As the first fluid mixture is fed through the membrane system, each graphene oxide-containing membrane can experience an osmotic pressure, which is required to drive the first fluid component or the second fluid component through each membrane. FIG. 4 is a schematic diagram modeling an arbitrarily-size membrane system using for calculating the osmotic pressures using non-dilute ideal solution model. Osmotic pressure required to preferentially drive a species through a selective membrane is given by Equation VII:

$$\Pi = \frac{-RT}{\bar{V}} \ln(\gamma_C x_C / \gamma_P x_P),$$

where $\bar{V}$ is the partial molar volume of the species on the permeate (low pressure) side, $\gamma$ is the activity coefficient of the species and $\chi$ is the molar fraction of the species. C and P denote the concentrate and permeate side of the membrane. R is the ideal gas constant. T is temperature.

The above expression and available data can be used to design the membrane system. To perform an initial assessment, the compositions are chosen to reflect values above and below the azeotrope. The osmotic pressure can then be estimated and a membrane can be selected such that the osmotic pressure is not impractically large.

In some embodiments, each graphene oxide-containing membrane can experience an osmotic pressure of less than about 2,000 psi, less than about 1,500 psi, less than about 1,000 psi, less than about 900 psi, less than about 800 psi, less than about 700 psi, less than about 600 psi, or less than about 500 psi. In some embodiments, each graphene oxide-containing membrane can experience an osmotic pressure of at least about 100 psi, at least about 200 psi, at least about 300 psi, at least about 400 psi, or at least about 500 psi.

Combinations of the above-referenced numbers to provide ranges for the osmotic pressure are also possible. For example, the osmotic pressure can be about 100 psi to about 2,000 psi, about 100 psi to about 1,000 psi, about 200 psi to about 900 psi, or about 200 psi to 800 psi.

In some embodiments, the feeding step comprises applying a pumping pressure on the first fluid mixture. In some embodiments, the osmotic pressure is about 50% or less, about 45% or less, about 40% or less, about 35% or less, or about 30% or less of the pumping pressure. The osmotic pressure is less than the pumping pressure to allow some overpressure to drive flux and transport.

In some embodiments, the second fluid component preferentially passes through each graphene oxide-containing membrane as compared to the first fluid component, and the second fluid mixture is produced on a concentrate side of each graphene oxide-containing membrane.

In some embodiments where the second fluid component preferentially passes through each graphene oxide-containing membrane, each of the at least two graphene oxide-containing membranes has a rejection rate for the first fluid component of not more than r1 or r2, whichever is less, as calculated by:

$$r1 = 1 - \left(1 - \frac{\gamma_c x_c}{\gamma_{p,final} \exp\left(\frac{-RT}{P_{max} \bar{V}}\right)}\right) \Big/ (1 - \gamma_c x_c), \quad \text{(Equation I)}$$

and $$r2 = 1 - \left(1 - \frac{\gamma_f x_f}{\gamma_{p,initial} \exp\left(\frac{-RT}{P_{max} \bar{V}}\right)}\right) \Big/ (1 - \gamma_f x_f), \quad \text{(Equation II)}$$

wherein:
c denotes the concentrate side of each membrane;
p denotes the permeate side of each membrane;
$\bar{V}$ is the partial molar volume of the second fluid component on the permeate side of each membrane;
$\gamma_{p,\, initial}$ is the activity coefficient of the second fluid component on the permeate side when the feed (i.e., the first fluid mixture) first enters the membrane system;
$\gamma_{p,\, final}$ is the activity coefficient of the second fluid component on the permeate side when the concentrate (i.e., the second fluid mixture) exits the membrane system;
$\gamma_c$ is the activity coefficient of the second fluid component in the second fluid mixture;
$\gamma_f$ is the activity coefficient of the second fluid component in the first fluid mixture;
$\chi_c$ is the molar fraction of the second fluid component in the second fluid mixture;
$\chi_f$ is the molar fraction of the second fluid component in the first fluid mixture;
R is the ideal gas constant;
T is temperature; and
$P_{max}$ is the maximum practical osmotic pressure.

In some embodiments, $P_{max}$ is about 50% or less, about 45% or less, about 40% or less, about 35% or less, or about 30% or less of the pumping pressure.

For example, when breaking the HCl—H$_2$O azeotrope and concentrating HCl, water preferentially passes through each graphene oxide-containing membrane, and the membranes are designed to reject HCl. Using Equations I and II, in the example of an HCl—H$_2$O mixture, and for simplicity assuming ideal solution and molar volume equal to that of pure water, a feed just below the azeotrope (20 wt % HCl or 78.8 mol % water) and a practical osmotic pressure maximum of 750 psi, the rejection rate for HCl is about 11%. If a maximum practical osmotic pressure of 1000, then the rejection rate for HCl is about 15%. Concentrated HCl is produced on the concentrate side of each graphene oxide-containing membrane.

In some embodiments, the first fluid component preferentially passes through each graphene oxide-containing membrane as compared to the second fluid component, and the second fluid mixture is produced on a permeate side of each graphene oxide-containing membrane.

In some embodiments where the first fluid component preferentially passes through each graphene oxide-containing membrane, a third fluid mixture is produced on a concentrate side of each membrane, and each of the at least two graphene oxide-containing membranes has a rejection rate for the second fluid component of not more than r1 or r2, whichever is less, as calculated by:

$$r1 = 1 - \left(1 - \frac{\gamma_c x_c}{\gamma_{p,final} \exp\left(\frac{-RT}{P_{max}\overline{V}}\right)}\right) \bigg/ (1 - \gamma_c x_c), \quad \text{(Equation III)}$$

and $$r2 = 1 - \left(1 - \frac{\gamma_f x_f}{\gamma_{p,initial} \exp\left(\frac{-RT}{P_{max}\overline{V}}\right)}\right) \bigg/ (1 - \gamma_f x_f), \quad \text{(Equation IV)}$$

wherein:
c denotes the concentrate side of each membrane;
p denotes the permeate side of each membrane;
$\overline{V}$ is the partial molar volume of the first fluid component on the permeate side of each membrane;
$\gamma_{p,\,initial}$ is the activity coefficient of the first fluid component on the permeate side when the feed (i.e., the first fluid mixture) first enters the membrane system;
$\gamma_{p,\,final}$ is the activity coefficient of the first fluid component on the permeate side when the concentrate (i.e., the third fluid mixture) exits the membrane system;
$\gamma_c$ is the activity coefficient of the first fluid component in the third fluid mixture;
$\gamma_f$ is the activity coefficient of the first fluid component in the first fluid mixture;
$x_c$ is the molar fraction of the first fluid component in the third fluid mixture;
$x_f$ is the molar fraction of the first fluid component in the first fluid mixture;
R is the ideal gas constant;
T is temperature; and
P$_{max}$ is the maximum practical osmotic pressure.

For example, when breaking the ethanol-water azeotrope and concentrating ethanol, ethanol preferentially passes through each graphene oxide-containing membrane, and the membranes are designed to reject water. A fluid mixture comprising 96 wt % or greater ethanol can be produced on the permeate side of each membrane.

As described herein, each graphene oxide-containing membrane can include a plurality of graphene oxide sheets. In some embodiments, each of the graphene oxide sheets can be coupled to an adjacent graphene oxide sheet via a chemical linker. A variety of chemical linkers are disclosed in U.S. Patent Publication No. US 2017/0341034 ("the '034 Publication"), the contents of which are incorporated herein. In some embodiments, the graphene oxide sheets can be covalently cross-linked using a chemical linkage that chemically links a first graphene oxide sheet to a second graphene oxide sheet. In some embodiments, an average d-spacing of the membrane when saturated with water is less than or equal to about 15 Å, about 14 Å, about 13 Å, about 12 Å, about 11 Å, about 10 Å, about 9 Å, about 8 Å, about 7 Å, about 6 Å, or about 5 Å, inclusive of all values and ranges therebetween. In some embodiments, the chemical linkage between the first graphene oxide sheet and the second graphene oxide sheet can be changed to tune the d-spacing and thereby the flux rate. In some embodiments, the charge chemistry of the chemical linkage between the first graphene oxide sheet and the second graphene oxide sheet can be changed such that the steric forces are adjusted such that the d-spacing between the graphene oxide sheets and flux rate are tuned.

In some embodiments, graphene oxide-containing membranes for fluid filtration can be tuned for permeability, solute rejection, and/or flux rate. In some embodiments, the crosslinker can be engineered to tune the rate of rejection of an undesirable component from a solution. In some embodiments, the graphene oxide-containing membrane can be functionalized such that species can be excluded based on charge. In some embodiments, a method of producing a graphene oxide-containing membrane includes covalently bonding a crosslinker to a first functional group on a first graphene oxide layer and to a second functional group on a second graphene oxide layer to form a graphene oxide-containing membrane and/or a functionalizing the graphene oxide-containing membrane. Examples of graphene oxide-containing membranes and methods of manufacturing and using graphene oxide-containing membranes are described in further detail in the '034 Publication incorporated by reference above.

In some embodiments, the graphene oxide-containing membrane can include at least about 2 layers, at least about 5 layers, at least about 10 layers, at least about 15 layers, at least about 20 layers, at least about 25 layers, at least about 30 layers, at least about 35 layers, or at least about 40 layers of graphene oxide sheets. In some embodiments, the graphene oxide-containing membrane can include no more than about 500 layers, no more than about 450 layers, no more than about 400 layers, no more than about 350 layers, no more than about 300 layers, no more than about 250 layers, or no more than about 200 layers of graphene oxide sheets.

Combinations of the above-referenced ranges for the number of layers are also possible (e.g., at least about 2 and less than about 500, or at least about 10 and less than about 200). In some embodiments, the graphene oxide-containing membrane can include about 2 to about 500 layers of graphene oxide sheets, e.g., 20-500 layers, 20-400 layers, 20-300 layers, 20-250 layers, 20-200 layers, 20-150 layers, 20-100 layers, 50-500 layers, 50-400 layers, 50-300 layers, 50-250 layers, 50-200 layers, 50-150 layers, or 50-100 layers.

In some embodiments, the graphene oxide-containing membrane can have a thickness greater than or equal to about 0.1 microns, greater than or equal to about 0.2 microns, greater than or equal to about 0.3 microns, greater than or equal to about 0.4 microns, greater than or equal to about 0.5 microns, greater man or equal to about 0.75 microns, greater than or equal to about 1 micron, greater than or equal to about 2 microns, greater than or equal to about 5 microns, greater than or equal to about 10 microns, greater than or equal to about 15 microns, greater than or equal to about 20 microns, greater than or equal to about 30 microns, greater than or equal to about 40 microns, greater than or equal to about 50 microns, greater than or equal to about 60 microns, greater than or equal to about 70 microns, greater than or equal to about 80 microns, or greater than or equal to about 90. In some embodiments, the thickness of the membrane may be less than or equal to about 100 microns, less than or equal to about 90 microns, less than or equal to about 80 microns, less than or equal to about 70 microns, less than or equal to about 60 microns, less than or equal to about 50 microns, less than or equal to about 40 microns, less than or equal to about 30 microns, less than or equal to about 10 microns, less man or equal to about 5 microns, less than or equal to about 1 micron, or less than or equal to about 0.5 microns.

Combinations of the above-referenced ranges for the thickness are also possible (e.g., greater than or equal to about 0.1 microns and less than or equal to about 100 microns, greater than or equal to about 0.2 microns and less than or equal to about 100 microns). In some embodiments, the graphene oxide-containing membrane can have a thickness of about 0.1 microns, about 0.15 microns, about 0.2 microns, about 0.25 microns, about 0.3 microns, about 0.35 microns, about 0.4 microns, about 0.45 microns, about 0.5 microns, about 0.55 microns, about 0.6 microns, about 0.65 microns, about 0.7 microns, about 0.75 microns, about 0.8 microns, about 0.85 microns, about 0.9 microns, about 0.95 microns, or about 1.0 micron.

In some embodiments, the aspect ratio (on the plane of the graphene oxide sheets) of the graphene oxide-containing membrane can be less than about 5,000,000, less than about 1,000,000, less than about 500,000, less than about 250,000, less than about 100,000, less than about 50,000, less than about 25,000, less than about 10,000, less than about 5,000, or less than about 1,000, inclusive of all values and ranges therebetween.

In some embodiments, the graphene oxide-containing membrane can have an overage pore size of greater than or equal to about 0.5 nm, greater than or equal to about 1 nm, greater than or equal to about 2 nm, greater than or equal to about 3 nm, greater than or equal to about 4 nm, or greater than or equal to about 5 nm. In some embodiments, the graphene oxide-containing membrane can have an overage pore size of less than or equal to about 6 nm, less than or equal to about 5 nm, less than or equal to about 4 nm, less than or equal to about 3 nm, or less than or equal to about 2 nm.

Combinations of the above-referenced ranges for the average pore size are also possible (e.g., greater than or equal to about 0.5 nm and less than or equal to about 6 nm, greater than or equal to about 1 nm and less than or equal to about 6 nm). In some embodiments, the graphene oxide-containing membrane can have an average pore size of about 0.5 nm, about 0.8 nm, about 1 nm, about 2 nm, about 3 nm, about 4 nm, about 5 nm, or about 6 nm.

In some embodiments, the graphene oxide sheets can be formed from a plurality of graphene oxide flakes. In some embodiments, the graphene oxide-containing membrane can have a weight percentage of graphene oxide in the membrane greater than or equal to about 40 wt %, about 45 wt %, about 50 wt %, about 55 wt %, about 60 wt %, about 65 wt %, about 70 wt %, or greater than about 75 wt %, inclusive of all values and ranges therebetween. In some embodiments, the graphene oxide-containing membrane can have a magnitude of zeta potential at a pH of about 7 of less than or equal to about 30 mV, about 25 mV, about 20 mV, about 15 mV, about 10 mV, about 9 mV, about 8 mV, about 7 mV, about 6 mV, or about 5 mV, inclusive of all values and ranges therebetween.

In some embodiments, the membrane system further comprises a support substrate in contact with each graphene oxide-containing membrane. The support substrate can include a material selected from polypropylene, polystyrene, polyethylene, polyethylene oxide, polyethersulfone, polytetrafluoroethylene, polyvinylidene fluoride, polymethylmethacrylate, polydimethylsiloxane, polyester, cellulose, cellulose acetate, cellulose nitrate, polyacrylonitrile, glass fiber, quartz, alumina, silver, polycarbonate, nylon, Kevlar or other aramid, or polyether ether ketone.

The at least two graphene oxide-containing membranes can be arranged to have a variety of configurations. In some embodiments, the at least two graphene oxide-containing membranes are parallel or substantially parallel to each other. In some embodiments, the membranes can be in the form of a spiral wound module. In some embodiments, each graphene oxide-containing membrane is in the form of a tube having a hollow core, the first fluid mixture being fed through the hollow core. The tube can be a tubular membrane module. In some embodiments, tubular modules include a minimum of two tubes; the inner tube, called the membrane tube, and the outer tube, which is the shell.

In some embodiments, the support substrate can comprise a plurality of flat polymer sheets combined to form a spiral filtration module. For example, in some embodiments, a spiral filtration module can comprise a plurality of flat polymer sheets stacked atop one another, and the plurality of stacked flat polymer sheets may be rolled around a core tube. In some embodiments, prior to being rolled around the core tube, adjacent flat polymer sheets may be separated by a sheet of feed channel spacer to form a leaf, and each leaf may be separated by a sheet of permeate spacer. When the flat polymer sheets, the one or more feed channel spacers, and the one or more permeate spacers are rolled around the core tube, each permeate spacer may form a permeate channel.

The azeotrope, the first fluid mixture, or the second fluid mixture can comprise at least 2, at least 3, or at least 4 fluid components. In some embodiments, the azeotrope, the first fluid mixture, or the second fluid mixture can comprise 2, 3, or 4 fluid components.

In some embodiments, the azeotrope and the first fluid mixture have the same fluid components. In some embodiments, the azeotrope and the second fluid mixture have the same fluid components. In some embodiments, the first fluid mixture and the second fluid mixture have the same fluid components.

The method described herein can be used to break any type of azeotropes, including but not limited to, positive azeotropes, negative azeotropes, homogeneous azeotropes, and heterogeneous azeotropes.

In some embodiments, the first fluid mixture comprises hydrochloric acid (HCl) and water, the hydrochloric acid being the first fluid component. In some embodiments, the first fluid mixture consists essentially of hydrochloric acid and water. The method described herein can thus be used to break the azeotrope in a HCl—$H_2O$ mixture. In some embodiments, the azeotrope in a HCl—$H_2O$ mixture includes about 20.2 wt % HCl and about 79.8 wt % $H_2O$, which is an example of negative azeotropes. For example, using the method described herein, a first fluid mixture having 20 wt % HCl and 80 wt % $H_2O$ can be fed through a membrane system to produce a second fluid mixture having 21.8 wt % HCl and 78.2 wt % $H_2O$, as shown in FIG.

8. In some embodiments, each of the at least two graphene oxide-containing membranes has a rejection rate of not more than 10% for HCl. For example, each membrane has a rejection rate of about 4% to about 10%, about 5% to about 10%, about 6% to about 10%, or about 7% to about 10% for HCl.

In some embodiments, the first fluid mixture comprises ethanol and water, the ethanol being the first fluid component. In some embodiments, the first fluid mixture consists essentially of ethanol (EtOH) and water. The method described herein can thus be used to break the azeotrope in an EtOH-H$_2$O mixture. In some embodiments, the azeotrope in an EtOH-H$_2$O mixture includes about 95.63 wt % ethanol and about 4.37 wt % water, which is an example of positive azeotropes.

In some embodiments, the first fluid mixture comprises propanol and water, the propanol being the first fluid component. In some embodiments, the first fluid mixture consists essentially of propanol and water. The method described herein can thus be used to break the azeotrope in a propanol-water mixture. In some embodiments, the azeotrope in a propanol-water mixture includes about 71.7 wt % propanol and about 28.3 wt % water.

In some embodiments, the first fluid mixture comprises nitric acid and water, the nitric acid being the first fluid component. In some embodiments, the first fluid mixture consists essentially of nitric acid and water. The method described herein can thus be used to break the azeotrope in a nitric acid-water mixture. In some embodiments, the azeotrope in an nitric acid-water mixture includes about 68 wt % nitric acid and 32 wt % water.

Additional azeotrope examples can be found in Tables 1-15. The method described herein can be used to break any one of these azeotrope.

TABLE 1

Azeotropes of water, boiling point (b.p.) = 100° C.

| 2nd Component | b.p. of comp. (° C.) | b.p. of mixture (° C.) | % by weight | spef. grav |
|---|---|---|---|---|
| with various alcohols | | | | |
| ethanol | 78.4 | 78.1 | 95.5 | 0.804 |
| methanol | 64.7 | No azeotrope | | |
| n-propanol | 97.3 | 87.7 | 71.7 | 0.866 |
| iso-propanol | 82.5 | 80.4 | 87.7 | 0.818 |
| n-butanol | 117.8 | 92.4 | 55.5 | |
| | | | U 79.9 | U 0.849 |
| | | | L 7.7 | L 0.990 |
| sec-butanol | 99.5 | 88.5 | 67.9 | 0.863 |
| iso-butanol | 108.0 | 90.0 | 70.0 | |
| | | | U 85.0 | U 0.839 |
| | | | L 8.7 | L 0.988 |
| tert-butanol | 82.8 | 79.9 | 88.3 | |
| allyl alcohol | 97.0 | 88.2 | 72.9 | 0.905 |
| benzyl alcohol | 205.2 | 99.9 | 9 | |
| furfuryl alcohol | 169.4 | 98.5 | 20 | |
| cyclohexanol | 161.1 | 97.8 | 20 | |
| benzyl alcohol | 205.4 | 99.9 | 9 | |
| with various organic acids | | | | |
| formic acid | 100.8 | 107.3 | 77.5 | |
| acetic acid | 118.1 | No azeotrope | | |
| propionic acid | 141.1 | 99.98 | 17.7 | 1.016 |
| butyric acid | 163.5 | 99.94 | 18.4 | 1.007 |
| iso-butyric acid | 154.5 | 99.3 | 21 | |
| with mineral acids | | | | |
| nitric acid | 83.0 | 120.5 | 68 | 1.405 |
| perchloric acid | 110.0 | 203 | 71.6 | |

TABLE 1-continued

Azeotropes of water, boiling point (b.p.) = 100° C.

| 2nd Component | b.p. of comp. (° C.) | b.p. of mixture (° C.) | % by weight | spef. grav |
|---|---|---|---|---|
| hydrofluoric acid | 19.9 | 120 | 37 | |
| hydrochloric acid | −84 | 110 | 20.24 | 1.102 |
| hydrobromic acid | −73 | 126 | 47.5 | 1.481 |
| hydroiodic acid | −34 | 127 | 57 | |
| sulfuric acid | 290 | 338 | 98 | |
| with various alkyl halides | | | | |
| ethylene chloride | 83.7 | 72 | 91.8 | |
| propylene chloride | 96.8 | 78 | 89.4 | |
| chloroform | 61.2 | 56.1 | 97.2 | |
| | | | U 0.8 | U 1.004 |
| | | | L 99.8 | L 1.491 |
| carbon tetrachloride | 76.8 | 66.8 | 95.9 | |
| | | | U 0.03 | U 1.000 |
| | | | L 99.97 | L 1.597 |
| methylene chloride | 40.0 | 38.8 | 99.6 | |
| | | | U 2.0 | U 1.009 |
| | | | 99.9 | L 1.328 |
| with various esters | | | | |
| ethyl acetate | 77.1 | 70.4 | 91.9 | |
| | | | U 96.7 | U 0.907 |
| | | | L 8.7 | L 0.999 |
| methyl acetate | 57.0 | 56.1 | 95.0 | 0.940 |
| n-propyl acetate | 101.6 | 82.4 | 86 | |
| ethyl nitrate | 87.7 | 74.4 | 78 | |
| with various other solvents | | | | |
| acetone | 56.5 | No azeotrope | | |
| methyl ethyl ketone | 79.6 | 73.5 | 89 | 0.834 |
| pyridine | 115.5 | 92.6 | 57 | 1.010 |
| benzene | 80.2 | 69.3 | 91.1 | |
| | | | U 99.94 | U 0.880 |
| | | | L 0.07 | L 0.999 |
| toluene | 110.8 | 84.1 | 79.8 | |
| | | | U 99.95 | U 0.868 |
| | | | L 0.06 | L 1.000 |
| cyclohexane | 80.7 | 69.8 | 91.5 | |
| | | | U 99.99 | U 0.780 |
| | | | L 0.01 | L 1.00 |
| diethyl ether | 34.5 | 34.2 | 98.7 | 0.720 |
| tetrahydrofuran | 66 | 65 | 95 | |
| anisole | 153.9 | 95.5 | 59.5 | |
| acetonitrile | 82.0 | 76.5 | 83.7 | 0.818 |
| chloral | 97.75 | 95.0 | 93.0 | |
| hydrazine | 113.5 | 120.3 | 68.5 | |
| m-xylene | 139.0 | 92.0 | 64.2 | |

TABLE 2

Azeotropes of ethanol, b.p. = 78.4° C.

| 2nd Component | b.p. of comp. (° C.) | b.p. of mixture (° C.) | % by weight | spef. grav |
|---|---|---|---|---|
| with various esters | | | | |
| ethyl acetate | 77.1 | 71.8 | 69.2 | 0.863 |
| methyl acetate | 57.0 | 56.9 | 97 | |
| ethyl nitrate | 87.7 | 71.9 | 56 | |
| isopropyl acetate | 88.4 | 76.8 | 47 | |
| with various hydrocarbons | | | | |
| benzene | 80.2 | 68.2 | 67.6 | 0.848 |
| cyclohexane | 80.7 | 64.9 | 69.5 | |
| toluene | 110.8 | 76.7 | 32 | 0.815 |
| n-pentane | 36.2 | 34.3 | 95 | |
| n-hexane | 68.9 | 58.7 | 79 | 0.687 |
| n-heptane | 98.5 | 70.9 | 51 | 0.729 |
| n-octane | 125.6 | 77.0 | 22 | |

TABLE 2-continued

Azeotropes of ethanol, b.p. = 78.4° C.

| 2nd Component | b.p. of comp. (° C.) | b.p. of mixture (° C.) | % by weight | spef. grav |
|---|---|---|---|---|
| with various alkyl halides | | | | |
| ethylene chloride | 83.7 | 70.5 | 63 | |
| chloroform | 61.1 | 59.4 | 93 | 1.403 |
| carbon tetrachloride | 76.8 | 65.1 | 84.2 | 1.377 |
| allyl chloride | 45.7 | 44 | 95 | |
| n-propyl chloride | 46.7 | 45.0 | 93 | |
| isopropyl chloride | 36.3 | 35.6 | 97.2 | |
| n-propyl bromide | 71.0 | 62.8 | 79.5 | |
| isopropyl bromide | 59.8 | 55.6 | 89.5 | |
| n-propyl iodide | 102.4 | 75.4 | 56 | |
| isopropyl iodide | 89.4 | 71.5 | 73 | |
| methyl iodide | 42.6 | 41.2 | 96.8 | |
| methylene chloride | 40.1 | 39.85 | 95.0 | |
| ethyl bromide | 38.0 | 37.0 | 97.0 | |
| trichloroethylene | 87 | 70.9 | 73.0 | 1.197 |
| Trichlorotrifluoroethane (CFU 113) | 47.7 | 43.8 | 96.2 | 1.517 |
| tetrachloroethylene | 121.0 | 76.75 | 37.0 | |
| with various other solvents | | | | |
| methyl ethyl ketone | 79.6 | 74.8 | 60 | 0.802 |
| acetonitrile | 82.0 | 72.9 | 43.0 | 0.788 |
| nitromethane | 101.3 | 75.95 | 26.8 | |
| tetrahydrofuran | 65.6 | 65.4 | 3.3 | |
| P = 100 kPa | | | | |
| thiophene | 84.1 | 70.0 | 55.0 | |
| carbon disulfide | 46.7 | 42.4 | 92 | |

TABLE 3

Azeotropes of methanol, b.p. = 64.7° C.

| 2nd Component | b.p. of comp. (° C.) | b.p. of mixture (° C.) | % by weight | spef. grav |
|---|---|---|---|---|
| with various esters | | | | |
| methyl acetate | 57.0 | 53.8 | 81.3 | 0.908 |
| ethyl acetate | 77.1 | 62.3 | 56 | 0.846 |
| ethyl formate | 54.1 | 51.0 | 84 | |
| with various hydrocarbons | | | | |
| benzene | 80.2 | 58.3 | 60.5 | 0.844 |
| toluene | 110.8 | 63.8 | 31 | 0.813 |
| cyclohexane | 80.8 | 45.2 | 62.8 | |
| | | | U 97.0 | |
| | | | L 39.0 | |
| n-pentane | 36.2 | 30.8 | 91 | |
| n-hexane | 68.9 | 50.6 | 72 | |
| n-heptane | 98.5 | 59.1 | 48.5 | |
| n-octane | 125.8 | 63.0 | 72.0 | |
| with various alkyl halides | | | | |
| methylene chloride | 40.0 | 37.8 | 92.7 | |
| ethylene chloride | 83.7 | 61.0 | 68 | |
| chloroform | 61.1 | 53.5 | 87.4 | 1.342 |
| carbon tetrachloride | 76.8 | 55.7 | 79.4 | 1.322 |
| ethyl bromide | 38.4 | 35.0 | 95.5 | |
| n-propyl chloride | 46.6 | 40.5 | 90.5 | |
| isopropyl chloride | 36.4 | 33.4 | 94 | |
| n-propyl bromide | 71.0 | 54.5 | 79 | |
| isopropyl bromide | 59.8 | 48.6 | 85.0 | |
| isopropyl iodide | 89.4 | 61.0 | 62 | |
| trichloroethylene | 87.2 | 60.2 | 64 | |
| tetrachloroethylene | 121.1 | 63.5 | 40.6 | |
| trichlorotrifluoroethane (CFC 113) | 47.7 | 39.9 | 94 | |
| with various other solvents | | | | |
| nitromethane | 101.2 | 64.6 | 9 | |
| acetone | 56.5 | 55.7 | 87.9 | 0.796 |

TABLE 3-continued

Azeotropes of methanol, b.p. = 64.7° C.

| 2nd Component | b.p. of comp. (° C.) | b.p. of mixture (° C.) | % by weight | spef. grav |
|---|---|---|---|---|
| acetonitrile | 82.0 | 63.45 | 19.0 | |
| carbon disulfide | 46.2 | 37.7 | 86.0 | |
| | | | U 50.8 | U 0.979 |
| | | | L 97.2 | L 1.261 |
| isopropanol | 82.5 | 64.0 | 20 | |
| tetrahydrofuran | 65.6 | 60.7 | 69.0 | |
| P = 984 mBar | | | | |

TABLE 4

Azeotropes of allyl alcohol, b.p. = 97.0° C.

| 2nd Component | b.p. of comp. (° C.) | b.p. of mixture (° C.) | % by weight | spef. grav |
|---|---|---|---|---|
| with various solvents | | | | |
| methyl butyrate | 102.7 | 93.8 | 45 | |
| n-propyl acetate | 101.6 | 94.2 | 47 | |
| benzene | 80.2 | 76.8 | 82.6 | 0.874 |
| toluene | 110.8 | 92.4 | 50 | |
| cyclohexane | 80.8 | 74 | 80 | |
| carbon tetrachloride | 76.8 | 72.3 | 88.5 | 1.450 |
| ethylene chloride | 83.7 | 79.9 | 82 | |

TABLE 5

Azeotropes of n-propanol, b.p. = 97.2° C.

| 2nd Component | b.p. of comp. (° C.) | b.p. of mixture (° C.) | % by weight | spef. grav |
|---|---|---|---|---|
| with various solvents | | | | |
| methyl butyrate | 102.7 | 94.4 | 51 | |
| n-propyl formate | 80.8 | 80.65 | 97 | |
| n-propyl acetate | 101.6 | 94.7 | 49 | 0.833 |
| benzene | 80.2 | 77.1 | 83.1 | |
| toluene | 110.8 | 92.4 | 47.5 | 0.836 |
| n-hexane | 68.9 | 65.7 | 96 | |
| carbon tetrachloride | 76.8 | 73.1 | 88.5 | 1.437 |
| ethylene chloride | 83.7 | 80.7 | 81 | |
| n-propyl bromide | 71.0 | 69.7 | 91 | |

TABLE 6

Azeotropes of isopropanol, b.p. = 82.5° C.

| 2nd Component | b.p. of comp. (° C.) | b.p. of mixture (° C.) | % by weight | spef. grav |
|---|---|---|---|---|
| with various esters | | | | |
| ethyl acetate | 77.1 | 75.3 | 75 | 0.869 |
| isopropyl acetate | 91.0 | 81.3 | 40 | 0.822 |
| with various hydrocarbons | | | | |
| benzene | 80.2 | 71.9 | 66.7 | 0.838 |
| toluene | 110.8 | 80.6 | 42 | |
| cyclohexane | 80.7 | 68.6 | 67.0 | 0.777 |
| n-pentane | 36.2 | 35.5 | 94 | |
| n-hexane | 68.9 | 62.7 | 77 | |
| n-heptane | 98.5 | 76.3 | 46 | |

TABLE 6-continued

Azeotropes of isopropanol, b.p. = 82.5° C.

| 2nd Component | b.p. of comp. (° C.) | b.p. of mixture (° C.) | % by weight | spef. grav |
|---|---|---|---|---|
| with various alkyl halides | | | | |
| carbon tetrachloride | 76.8 | 69.0 | 82 | 1.344 |
| chloroform | 61.1 | 60.8 | 95.8 | |
| ethylene chloride | 83.7 | 74.7 | 56.5 | |
| ethyl iodide | 83.7 | 67.1 | 85 | |
| n-propyl chloride | 46.7 | 46.4 | 97.2 | |
| n-propyl bromide | 71.0 | 66.8 | 79.5 | |
| isopropyl bromide | 59.8 | 57.8 | 88 | |
| n-propyl iodide | 102.4 | 79.8 | 58 | |
| isopropyl iodide | 89.4 | 76.0 | 68 | |
| tetrachloroethylene | 121.1 | 81.7 | 19.0 | |
| with various other solvents | | | | |
| methyl ethyl ketone | 79.0 | 77.5 | 68 | 0.800 |
| diisopropyl ether | 69 | 66.2 | 85.9 | |
| nitromethane | 101.0 | 79.3 | 70 | |

TABLE 7

Azeotropes of acetic acid, b.p. = 118.5° C.

| 2nd Component | b.p. of comp. (° C.) | b.p. of mixture (° C.) | % by weight | spef. grav |
|---|---|---|---|---|
| with various solvents | | | | |
| benzene | 80.2 | 80.05 | 98 | 0.882 |
| cyclohexane | 80.8 | 79.7 | 98 | |
| toluene | 110.8 | 105.0 | 72 | 0.905 |
| m-xylene | 139.0 | 115.4 | 27.5 | 0.908 |
| n-heptane | 98.5 | 92.3 | 70 | |
| n-octane | 125.8 | 109.0 | 50 | |
| isopropyl iodide | 89.2 | 88.3 | 91 | |
| carbon tetrachloride | 76.8 | 76.6 | 97 | |
| tetrachloroethylene | 121.0 | 107.4 | 61.5 | |
| ethylene bromide | 131.7 | 114.4 | 45 | |
| 1,1-dibromoethane | 109.5 | 103.7 | 75.0 | |
| methylene bromide | 98.2 | 94.8 | 84.0 | |
| pyridine | 115.3 | 139.7 | 65.0 | 1.024 |

TABLE 8

Azeotropes of formic acid, b.p. = 100.8° C.

| 2nd Component | b.p. of comp. (° C.) | b.p. of mixture (° C.) | % by weight | spef. grav |
|---|---|---|---|---|
| with various hydrocarbons | | | | |
| benzene | 80.2 | 71.7 | 69 | |
| toluene | 110.8 | 85.8 | 50 | |
| m-xylene | 139.0 | 94.2 | 29.8 | |
| m-xylene | 139.0 | 92.8 | 28.2 | |
| o-xylene | 143.6 | 95.5 | 26 | |
| p-xylene | 138.4 | ~95 | 30.0 | |
| n-pentane | 36.2 | 34.2 | 90 | |
| n-hexane | 68.9 | 60.6 | 72 | |
| n-heptane | 98.5 | 78.2 | 56.5 | |
| n-octane | 125.8 | 90.5 | 37 | |
| with various alkyl halides | | | | |
| chloroform | 61.2 | 59.2 | 85 | |
| carbon tetrachloride | 76.8 | 66.7 | 81.5 | |
| methyl iodide | 42.6 | 42.1 | 94 | |
| ethyl bromide | 38.4 | 38.2 | 97 | |
| ethylene chloride | 83.6 | 77.4 | 86 | |
| ethylene bromide | 131.7 | 94.7 | 48.5 | |

TABLE 8-continued

Azeotropes of formic acid, b.p. = 100.8° C.

| 2nd Component | b.p. of comp. (° C.) | b.p. of mixture (° C.) | % by weight | spef. grav |
|---|---|---|---|---|
| n-propyl chloride | 46.7 | 45.6 | 92 | |
| isopropyl chloride | 34.8 | 34.7 | 98.5 | |
| n-propyl bromide | 71.0 | 64.7 | 73 | |
| isopropyl bromide | 59.4 | 56.0 | 86 | |
| with various other solvents | | | | |
| carbon disulfide | 46.3 | 42.6 | 83 | |

TABLE 9

Azeotropes of ethylene glycol, b.p. = 197.4° C.

| 2nd Component | b.p. of comp. (° C.) | b.p. of mixture (° C.) | % by weight | spef. grav |
|---|---|---|---|---|
| with various solvents | | | | |
| ethyl benzoate | 212.6 | 186.1 | 53.5 | |
| diphenyl | 254.9 | 192.0 | 36 | |
| mesitylene | 164.6 | 156.0 | 87 | |
| naphthalene | 218.1 | 183.9 | 49 | |
| toluene | 110.8 | 110.2 | 93.5 | |
| m-xylene | 139.0 | 135.6 | 85 | |
| o-xylene | 144.4 | 139.6 | 84.0 | |
| ethylene bromide | 131.7 | 129.8 | 96 | |
| nitrobenzene | 210.9 | 185.9 | 41 | |
| chlorobenzene | 132.0 | 130.1 | 5.6 | |
| benzyl chloride | 179.3 | 167.0 | 70 | |
| benzyl alcohol | 205.1 | 193.1 | 44 | |
| anisole | 153.9 | 150.5 | 89.5 | |
| acetophenone | 202.1 | 185.7 | 48 | |
| aniline | 184.4 | 180.6 | 76 | |
| o-cresol | 191.1 | 189.6 | 73 | |

TABLE 10

Azeotropes of glycerol, b.p. = 291.0° C.

| 2nd Component | b.p. of comp. (° C.) | b.p. of mixture (° C.) | % by weight | spef. grav |
|---|---|---|---|---|
| diphenyl | 254.9 | 243.8 | 45 | |
| naphthalene | 218.1 | 215.2 | 90 | |

TABLE 11

Azeotropes of benzene, b.p. = 80.1° C.

| 2nd Component | b.p. of comp. (° C.) | b.p. of mixture (° C.) | % by weight | spef. grav |
|---|---|---|---|---|
| cyclohexane | 80.74 | 77.8 | 45.0 | 0.834 |
| ethyl nitrate | 88.7 | 80.03 | 12.0 | |
| methyl ethyl ketone | 79.6 | 78.4 | 37.5 | 0.853 |
| nitromethane | 101.0 | 79.15 | 14.0 | |
| acetonitrile | 82.0 | 73.0 | 34.0 | |
| n-heptane | 98.5 | 80.0 | 1 | |

TABLE 12

Azeotropes of acetone, b.p. = 56.5° C.

| 2nd Component | b.p. of comp. (° C.) | b.p. of mixture (° C.) | % by weight | spef. grav |
|---|---|---|---|---|
| carbon disulfide | 46.3 | 39.3 | 67.0 | 1.04 |
| chloroform | 61.2 | 64.7 | 80.0 | 1.268 |
| cyclohexane | 80.74 | 53.0 | 33.0 | |
| n-hexane | 68.8 | 49.8 | 41 | |
| ethyl iodide | 56.5 | 55.0 | 40.0 | |
| carbon tetrachloride | 76.8 | 56.2 | 11.9 | |

TABLE 13

Miscellaneous azeotrope pairs

| component 1 | b.p. comp. 1 (° C.) | component 2 | b.p. comp. 2 (° C.) | b.p. azeo. (° C.) | % wt comp. 1 | % wt comp. 2 | spec. grav. |
|---|---|---|---|---|---|---|---|
| acetaldehyde | 21.0 | diethyl ether | 34.6 | 20.5 | 76.0 | 24.0 | 0.762 |
| | | n-butane | −0.5 | −7.0 | 16.0 | 84.0 | |
| acetamide | 222.0 | benzaldehyde | 179.5 | 178.6 | 6.5 | 93.5 | |
| | | nitrobenzene | 210.9 | 202.0 | 24.0 | 76.0 | |
| | | o-xylene | 144.1 | 142.6 | 11.0 | 89.0 | |
| acetonitrile | 82.0 | ethyl acetate | 77.15 | 74.8 | 23.0 | 77.0 | |
| | | toluene | 110.6 | 81.1 | 76.0 | 24.0 | |
| acetylene | −86.6 | ethane | −88.3 | −94.5 | 40.7 | 59.3 | |
| aniline | 184.4 | o-cresol | 191.5 | 191.3 | 8.0 | 92.0 | |
| carbon disulfide | 46.2 | diethyl ether | 34.6 | 34.4 | 1.0 | 99.0 | 0.719 |
| | | 1,1-dichloroethane | 57.2 | 46.0 | 94.0 | 6.0 | |
| | | methyl ethyl ketone | 79.6 | 45.9 | 84.7 | 15.3 | 1.157 |
| | | ethyl acetate | 77.1 | 46.1 | 97 | 3 | |
| | | methyl acetate | 57.0 | 40.2 | 73 | 27 | |
| chloroform | 61.2 | methyl ethyl ketone | 79.6 | 79.9 | 17.0 | 83.0 | 0.877 |
| | | n-hexane | 68.7 | 60.0 | 72.0 | 28.0 | 1.101 |
| carbon tetrachloride | 76.8 | methyl ethyl ketone | 79.9 | 73.8 | 71.0 | 29.0 | 1.247 |
| | | ethylene dichloride | 84.0 | 75.3 | 78.0 | 22.0 | 1.500 |
| | | ethyl acetate | 77.1 | 74.8 | 57.0 | 43.0 | 1.202 |
| cyclohexane | 80.74 | ethyl acetate | 77.15 | 72.8 | 46.0 | 54.0 | |
| | | ethyl nitrate | 88.7 | 74.5 | 64.0 | 36.0 | |
| diethyl ether | 34.6 | methyl formate | 31.50 | 28.2 | 44.0 | 56.0 | |
| | | methylene chloride | 40 | 40.8 | 30 | 70 | |
| nitromethane | 101.0 | toluene | 110.8 | 96.5 | 55.0 | 45.0 | |
| tetrahydrofuran | 65.6 | chloroform | 61.2 | 72.5 | 34.5 | 65.5 | |
| | | n-hexane | 69 | 63.0 | 46.5 | 53.5 | |
| toluene | 110.63 | pyridine | 115.3 | 110.2 | 78.0 | 22.0 | |
| propylene glycol | 188.2 | aniline | 184.4 | 179.5 | 43 | 57 | |
| | | o-xylene | 144.4 | 135.8 | 10 | 90 | |
| | | toluene | 110.6 | 110.5 | 1.5 | 98.5 | |

TABLE 14

Ternary azeotropes of water, b.p. = 100° C.

| 2nd component | b.p. 2nd comp. (° C.) | 3rd component | b.p. 3rd comp. (° C.) | b.p. azeo. (° C.) | % wt 1st | % wt 2nd | % wt 3rd | spec. gray |
|---|---|---|---|---|---|---|---|---|
| ethanol | 78.4 | ethyl acetate | 77.1 | 70.3° C. | 7.8 | 9.0 | 83.2 | 0.901 |
| | | cyclohexane | 80.8 | 62.1 | 7 | 17 | 76 | |
| | | benzene | 80.2 | 64.9 | 7.4 | 18.5 | 74.1 | |
| | | | | | U | U | U | U |
| | | | | | 1.3 | 12.7 | 86.0 | 0.866 |
| | | | | | L | L | L | L |
| | | | | | 43.1 | 52.1 | 4.8 | 0.892 |
| | | chloroform | 61.2 | 55.5 | 3.5 | 4.0 | 92.5 | |
| | | | | | U | U | U | U |
| | | | | | 80.8 | 18.2 | 1.0 | 0.976 |
| | | | | | L | L | L | L |
| | | | | | 0.5 | 3.7 | 95.8 | 1.441 |

TABLE 14-continued

Ternary azeotropes of water, b.p. = 100° C.

| 2nd component | b.p. 2nd comp. (° C.) | 3rd component | b.p. 3rd comp. (° C.) | b.p. azeo. (° C.) | % wt 1st | % wt 2nd | % wt 3rd | spec. gray |
|---|---|---|---|---|---|---|---|---|
| | | carbon tetrachloride | 86.8 | 61.8 | 4.3 | 9.7 | 86.0 | |
| | | | | | 3.4 | 10.3 | 86.3 | |
| | | | | | U | U | U | U |
| | | | | | 44.5 | 48.5 | 7.0 | 0.935 |
| | | | | | L | L | L | L |
| | | | | | <0.1 | 5.2 | 94.8 | 1.519 |
| | | ethylene chloride | 83.7 | 66.7 | 5 | 17 | 78 | |
| | | acetonitrile | 82.0 | 72.9 | 1.0 | 55.0 | 44.0 | |
| | | toluene | 110.6 | 74.4 | 12.0 | 37.0 | 51.0 | |
| | | | | | U | U | U | U |
| | | | | | 3.1 | 15.6 | 81.3 | 0.849 |
| | | | | | L | L | L | L |
| | | | | | 20.7 | 54.8 | 24.5 | 0.855 |
| | | methyl ethyl ketone | 79.6 | 73.2 | 11.0 | 14.0 | 75.0 | 0.832 |
| | | n-hexane | 69.0 | 56.0 | 3.0 | 12.0 | 85.0 | |
| | | | | | U | U | U | U |
| | | | | | 0.5 | 3.0 | 96.5 | 0.672 |
| | | | | | L | L | L | L |
| | | | | | 19.0 | 75.0 | 6.0 | 0.833 |
| | | n-heptane | 98.4 | 68.8 | 6.1 | 33.0 | 60.9 | |
| | | | | | U | U | U | U |
| | | | | | 0.2 | 5.0 | 94.8 | 0.686 |
| | | | | | L | L | L | L |
| | | | | | 15.0 | 75.9 | 9.1 | 0.801 |
| | | carbon disulfide | 46.2 | 41.3 | 1.6 | 5.0 | 93.4 | |
| n-propanol | 97.2 | cyclohexane | 80.8 | 66.6 | 8.5 | 10.0 | 81.5 | |
| | | benzene | 80.2 | 68.5 | 8.6 | 9.0 | 82.4 | |
| | | carbon tetrachloride | 76.8 | 65.4 | 5 | 11 | 84 | |
| | | | | | U | U | U | U |
| | | | | | 84.9 | 15.0 | 0.1 | 0.979 |
| | | | | | L | L | L | L |
| | | | | | 1.0 | 11.0 | 88.0 | 1.436 |
| | | diethyl ketone | 102.2 | 81.2 | 20 | 20 | 60 | |
| | | n-propyl acetate | 101.6 | 82.2 | 21.0 | 19.5 | 59.5 | |
| isopropanol | 82.5 | cyclohexane | 80.8 | 64.3 | 7.5 | 18.5 | 74.0 | |
| | | | | 66.1 | 7.5 | 21.5 | 71.0 | |
| | | benzene | 80.2 | 66.5 | 7.5 | 18.7 | 73.8 | |
| | | | | 65.7° C. | 8.2 | 19.8 | 72.0 | |
| | | | | | U | U | U | U |
| | | | | | 2.3 | 20.2 | 77.5 | 0.855 |
| | | | | | L | L | L | L |
| | | | | | 85.1 | 14.4 | 0.5 | 0.966 |
| | | methyl ethyl ketone | 79.6 | 73.4 | 11.0 | 1.0 | 88.0 | 0.834 |
| | | toluene | 110.6 | 76.3 | 13.1 | 38.2 | 48.7 | |
| | | | | | U | U | U | U |
| | | | | | 8.5 | 38.2 | 53.3 | 0.845 |
| | | | | | L | L | L | L |
| | | | | | 61.0 | 38.0 | 1.0 | 0.930 |
| allyl alcohol | 97.0 | n-hexane | 69.0 | 59.7 | 5 | 5 | 90 | |
| | | | | | U | U | U | U |
| | | | | | 0.5 | 3.6 | 95.9 | 0.668 |
| | | | | | L | L | L | L |
| | | | | | 64.4 | 34.8 | 0.8 | 0.964 |
| | | benzene | 80.2 | 68.2 | 8.6 | 9.2 | 82.2 | |
| | | | | | U | U | U | U |
| | | | | | 0.6 | 8.7 | 90.7 | 0.877 |
| | | | | | L | L | L | L |
| | | | | | 80.9 | 17.7 | 0.4 | 0.985 |
| | | cyclohexane | 80.8 | 66.2 | 8 | 11 | 81 | |
| | | carbon tetrachloride | 76.8 | 65.2 | 5 | 11 | 84 | |
| | | | | | U | U | U | U |
| | | | | | 71.7 | 25.6 | 2.7 | 0.777 |
| | | | | | L | L | L | L |
| | | | | | 0.8 | 10.1 | 89.1 | 1.464 |

TABLE 14-continued

Ternary azeotropes of water, b.p. = 100° C.

| 2nd component | b.p. 2nd comp. (° C.) | 3rd component | b.p. 3rd comp. (° C.) | b.p. azeo. (° C.) | % wt 1st | % wt 2nd | % wt 3rd | spec. gray |
|---|---|---|---|---|---|---|---|---|
| benzene | 80.1 | acetonitrile | 82.0 | 66.0 | 8.2 | 68.5 | 23.3 | |
| | | methyl ethyl ketone | 79.6 | 68.2 | 8.8 | 65.1 | 26.1 | |
| | | | | | U | U | U | U |
| | | | | | 0.6 | 71.3 | 28.1 | 0.858 |
| | | | | | L | L | L | L |
| | | | | | 94.7 | 0.1 | 5.2 | 0.992 |
| methyl ethyl ketone | 79.6 | carbon tetrachloride | 76.8 | 65.7 | 3.0 | 22.2 | 74.8 | |
| | | | | | U | U | U | U |
| | | | | | 94.4 | 5.5 | 0.1 | 0.993 |
| | | | | | L | L | L | L |
| | | | | | 0.1 | 22.6 | 77.3 | 1.313 |
| | | cyclohexane | 81.0 | 63.6 | 5.0 | 60.0 | 35.0 | |
| | | | | | U | U | U | U |
| | | | | | 0.6 | 37.0 | 62.4 | 0.769 |
| | | | | | L | L | L | L |
| | | | | | 89.9 | 10.0 | 0.1 | 0.98 |
| chloroform | 61.2 | methanol | 64.65 | 52.6 | 4.0 | 81.0 | 15.0 | |
| | | | | | U | U | U | U |
| | | | | | 27.0 | 32.0 | 41.0 | 1.022 |
| | | | | | L | L | L | L |
| | | | | | 3.0 | 83.0 | 14.0 | 1.399 |
| | | acetone | 56.5 | 60.4 | 4.0 | 57.6 | 38.4 | |

TABLE 15

Ternary azeotropes of methanol, b.p. = 64.65° C.

| 2nd component | b.p. 2nd comp. (° C.) | 3rd component | b.p. 3rd comp. (° C.) | b.p. azeo. (° C.) | % wt 1st | % wt 2nd | % wt 3rd | spec. grav |
|---|---|---|---|---|---|---|---|---|
| acetone | 56.5 | chloroform | 61.2 | 57.5 | 23.0 | 30.0 | 47.0 | |
| | | methyl acetate | 57.0 | 53.7 | 17.4 | 5.8 | 76.8 | 0.898 |
| | | cyclohexane | 81.4 | 51.5 | 16.0 | 43.5 | 40.5 | |
| methyl acetate | 57.1 | carbon disulfide | 46.2 | 37.0 | | | | |
| | | cyclohexane | 81.4 | 50.8 | 17.8 | 48.6 | 33.6 | |
| | | n-hexane | 69.0 | 45.0 | 14.0 | 27.0 | 59.0 | 0.73 |

In one aspect, the present disclosure provides a method of concentrating a first fluid component in a first fluid mixture, the first fluid mixture comprising the first fluid component at a first concentration and a second fluid component, wherein the method comprises: distilling the first fluid mixture through a first distillation column to produce a second fluid mixture having the first fluid component at a second concentration, the second concentration being greater than the first concentration and less than an azeotropic concentration of the first fluid component in the second fluid mixture, and feeding the second fluid mixture through a membrane system comprising at least two graphene oxide-containing membranes to produce a third fluid mixture having the first fluid component at a third concentration that is greater than the azeotropic concentration.

In some embodiments, the method disclosed herein can concentrate the first fluid component having a concentration in region 2 to a concentration in region 3 that is greater than the azeotropic concentration, as shown in FIGS. 2-3. An azeotrope comprising the first fluid component and the second fluid component is broken during the feeding step.

Figure 6A:
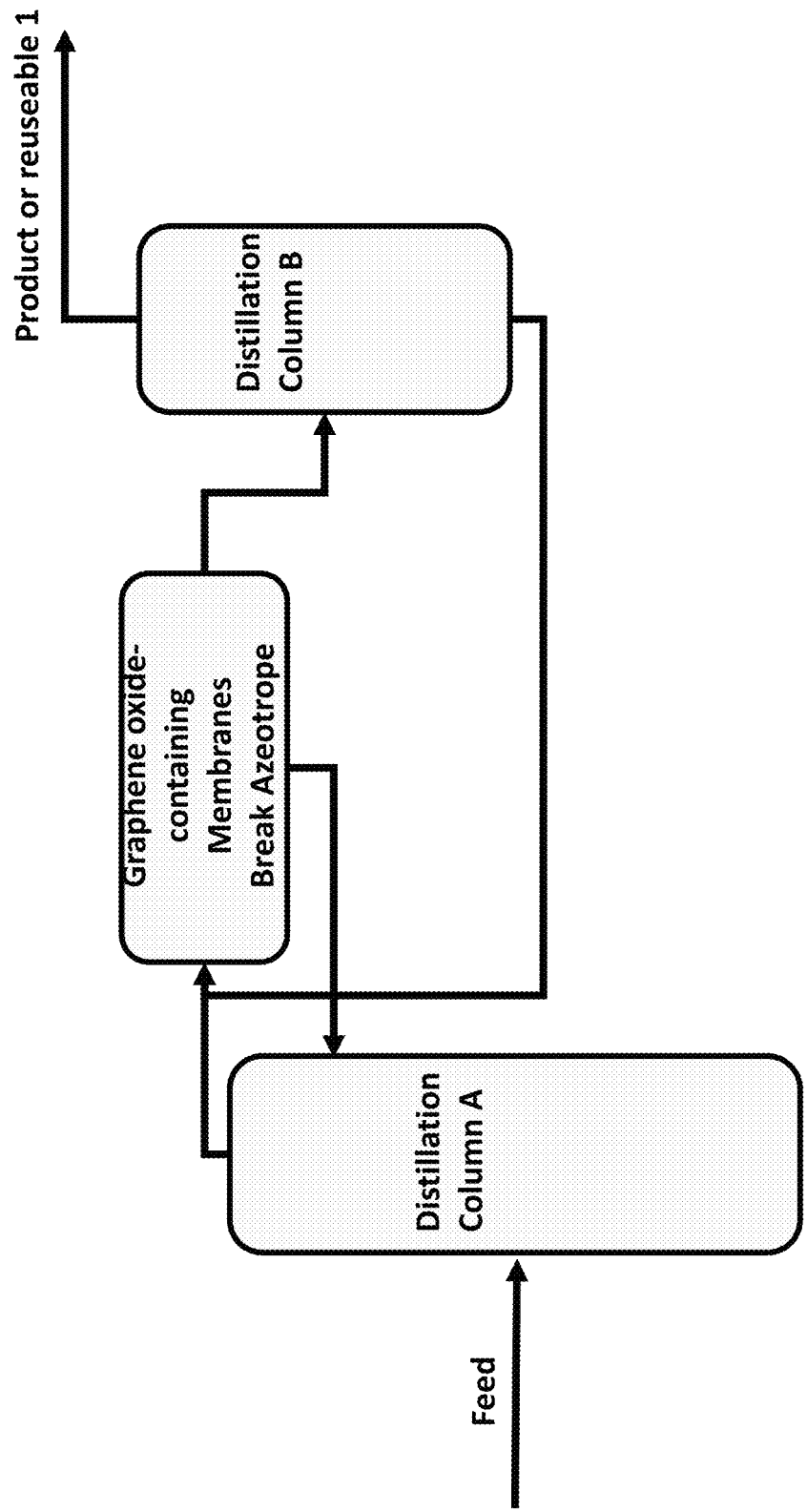
FIG. 6A is a schematic diagram showing the combined use of distillation and membrane separation to break an azeotrope and concentrate a fluid component in a fluid mixture, according to some embodiments.
Figure 6B:
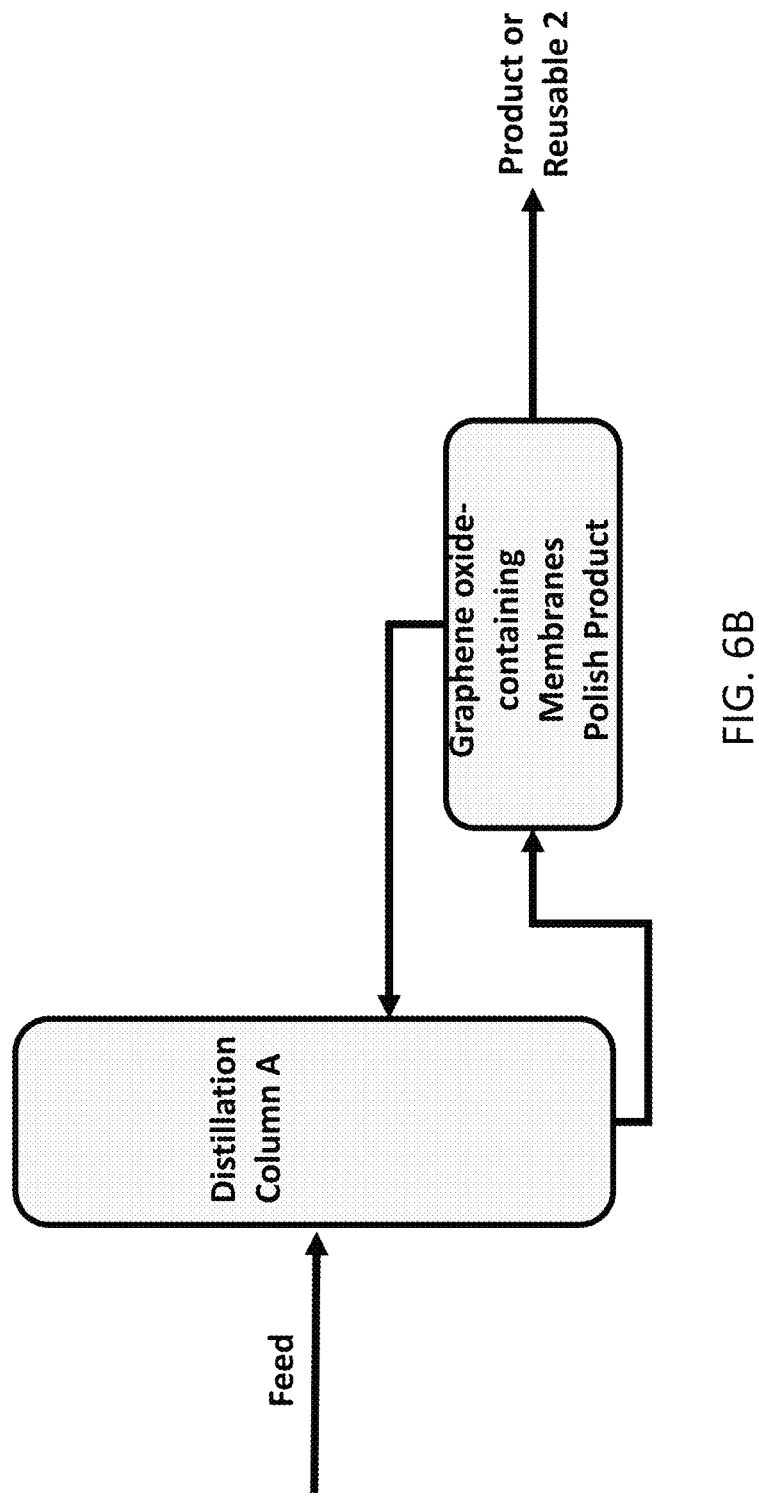
FIG. 6B is a schematic diagram showing the combined use of distillation and membrane separation to concentrate a fluid component in a fluid mixture, wherein the fluid component is highly concentrated in the final product, according to some embodiments.

In accordance with some embodiments, FIG. 6A illustrates a system where the method described herein can be performed. The system can include a first distillation column coupled to a membrane system, the membrane system being optionally coupled to a second distillation column. The arrows denote the flow of fluid mixtures through the system, with the feed entering the first distillation column being an upstream event.

As described herein, distillation processes can include one or more thermal separation processes whereby one or more molecules from the solution can be removed from the solution by heating the solution to a temperature greater than the boiling point of the one or more molecules. In some embodiments, the distillation processes can include one or more distillation columns or the like. In some embodiments, the distillation process can include a flash distillation process, a batch distillation process, a differential distillation process, a continuous distillation process, steam distillation, vacuum distillation, short path distillation, distillation columns, distillation towers, multi-effect distillation processes, combinations thereof, and the like. Briefly, the distillation processes described herein are physical separation processes that rely primarily or solely on differences in volatility (e.g., boiling point, vapor pressure, etc.) of two or more components of a mixture. As used herein, the distillation processes and equipment are intended to be non-limiting and any disclosure related to the use of a distillation process or equipment should not be considered limiting in any way.

In some embodiments, the first distillation column or the second distillation column can include at least about one tray, at least about two trays, at least about five trays, at least about 10 trays, or at least about 15 trays. The minimum number of trays can be calculated with the Fenske equation. In some embodiments, the first distillation column or the second distillation column can include no more than about 50 trays, no more than about 45 trays, no more than about 40 trays, no more than about 35 trays, no more than about 30 trays, no more than about 25 trays, no more than about 20 trays, or no more than about 15 trays.

Combinations of the above-referenced ranges for the number of trays are also possible (e.g., at least about 1 and no more than about 50, or at least about 10 and no more than about 40). In some embodiments, the first distillation column or the second distillation column can include about 1 to about 50 trays, e.g., 1-50 trays, 2-50 trays, 5-50 trays, 5-40 trays, 5-30 trays, 5-20 trays, or 10-40 trays.

In some embodiments, the tray can be a bubble cap tray, a sieve tray, or a valve tray.

In some embodiments, the first concentration can be at least about 1 mol %, at least about 2 mol %, at least about 3 mol %, at least about 4 mol %, at least about 5 mol %, at least about 6 mol %, at least about 7 mol %, at least about 8 mol %, at least about 9 mol %, or at least about 10 mol %. The first concentration is less than the azeotropic concentration.

In some embodiments, the first concentration can be about 1.0 mol %, about 1.5 mol %, about 2.0 mol %, about 2.5 mol %, about 3.0 mol %, about 3.5 mol %, about 4.0 mol %, about 4.5 mol %, about 5.0 mol %, about 5.5 mol %, about 6.0 mol %, about 6.5 mol %, about 7.0 mol %, about 7.5 mol %, about 8.0 mol %, about 8.5 mol %, about 9.0 mol %, about 9.5 mol %, about 10.0 mol %, about 11.0 mol %, about 12 mol %, about 13 mol %, about 14 mol %, about 15 mol %, about 16 mol %, about 17 mol %, about 18 mol %, about 19 mol %, about 20.0 mol %, about 25 mol %, about 30 mol %, about 35 mol %, about 40 mol %, about 45 mol %, about 50 mol %, about 55 mol %, about 60 mol %, about 65 mol %, about 70 mol %, about 75 mol %, or about 80 mol % less than the second concentration.

Combinations of the above-referenced numbers to provide ranges for the first concentration are also possible. For example, the first concentration can be about 1.0 mol % to about 80.0 mol %, about 1.0 mol % to about 60.0 mol %, about 1.0 mol % to about 20.0 mol %, about 2.0 mol % to about 80.0 mol %, about 2.0 mol % to about 60.0 mol %, about 2.0 mol % to about 20.0 mol %, about 5 mol % to about 80 mol %, about 5 mol % to about 60 mol %, about 5 mol % to about 18 mol %, or about 5 mol % to about 15 mol % less than the second concentration.

In some embodiments, the method further comprises distilling the third fluid mixture through a second distillation column to produce a fourth fluid mixture having the first fluid component at a fourth concentration that is greater than the third concentration. For example, using an initial fluid mixture from region 2 as a starting material, the method can produce a final fluid mixture in region 4 of FIG. 2.

In some embodiments, as the second fluid mixture is fed through the membrane system, the third fluid mixture is produced on a concentrate side of each membrane, and a fifth fluid mixture is produced on the permeate side of each membrane. The fifth fluid mixture can have the first fluid component at a fifth concentration that is less than the second concentration. In some embodiments, the method can further include distilling the fifth fluid mixture through the first distillation column.

In some embodiments, as the second fluid mixture is fed through the membrane system, the third fluid mixture is produced on a permeate side of each membrane, and a sixth fluid mixture on a concentrate side of each membrane. The sixth fluid mixture can have the first fluid component at a sixth concentration that is less than the second concentration. In some embodiments, the method can further include distilling the sixth fluid mixture through the first distillation column.

As the third fluid mixture is distilled through the second distillation column, a seventh fluid mixture is produced, which can have the first fluid component at a seventh concentration that is less than the azeotropic concentration but greater than or equal to the second concentration. In some embodiments, the method can further include feeding the seventh fluid mixture through the membrane system to break the azeotrope.

An important yet unexpected outcome of the integration of the graphene oxide-containing membranes with conventional distillation processes is that the temperature and pressure of process streams need not be reduced before being communicated through the graphene oxide-containing membrane. In other words, using conventional membranes for such an integrated process would lead to the degradation and failure of the conventional membranes unless the process feed is cooled and the pressure reduced prior to membrane separation. Since a reduction in temperature and pressure is not required in order to communicate the process feed into the graphene oxide-containing membrane separation process, the concentration or separation of the process feed can be accomplished in less time and using fewer unit processes.

In some embodiments, the second fluid mixture can be fed through the membrane system without being cooled. In some embodiments, the seventh fluid mixture can be fed through the membrane system without being cooled. High-temperature membrane operation can enable low heat loss through when the fluid mixture is transitioned from the distillation column to the membrane system.

Figure 8:
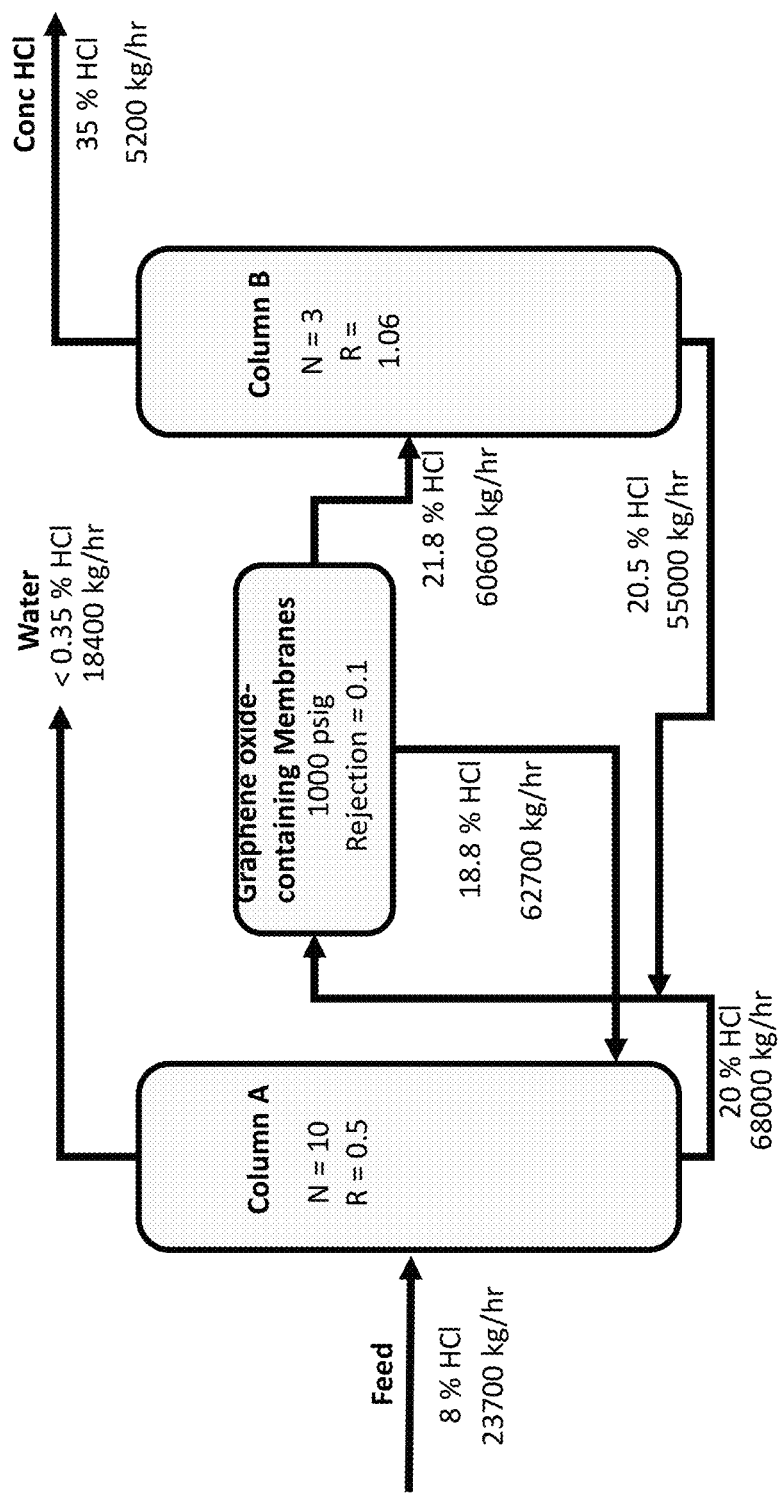
FIG. 8 is a schematic diagram showing a process flow for concentrating HCl in a HCl-water mixture, according to some embodiments. N stands for the number of trays in the column. R stands for the reflux, i.e., fluid recycled from the top to bottom to obtain purer distillation. The percentages in FIG. 8 are weight percentages.

The method described herein is exemplified in FIG. 8, which is a schematic diagram showing a process for concentrating a waste hydrochloric acid stream. The waste stream of HCl contains about 1 wt % to about 18 wt % (e.g., about 3 wt % to about 18 wt %, about 5 wt % to about 15 wt %, or about 8 wt %) HCl and a few trace contaminants in water. HCl is substantially more valuable for resale at concentrations in the range of about 33 wt % to about 37 wt %. The use of distillation processes alone for increasing the concentration of HCl in the solution is not economically feasible, so the waste HCl is currently neutralized and disposed of as a waste product, a process that is very expensive. Through the combined use of distillation and membrane separation, the final fluid mixture can include 35 wt % HCl. In some embodiments, the rejection rate of each graphene-oxide containing membrane is about 10% for HCl.

The systems and methods of the present disclosure for concentrating the 8 wt % HCl waste stream leverages the strengths of both membrane and thermal separation processes. The osmotic pressure of 8 wt %, 21 wt %, and 35 wt % HCl mixtures are 1,706 psi, 2,948 psi, and 10,866 psi, respectively (assuming full ionization). For context, high-pressure reverse osmosis membrane filtration systems typically operate at less than or equal to about 1,000 psi; operating at even higher pressure may result in untenable costs. However, breaking the azeotrope with membranes (by pushing from 19.5 wt % to 21.5 wt %, for example) requires an osmotic pressure difference of only about 637 psi. Thus, this high value step can often be accomplished with a membrane with only about 10% rejection of HCl, but the retentate from prior distillation processes often enter the membrane separation process at greater than or equal to about 110° C. By using separation membranes, such as the graphene oxide-containing membranes described herein, the separations necessary to overcome the azeotropes and valorize the HCl waste stream can result in increased energy efficiency and improved process economics. These processes and methods are possible because the durability of the separation membranes described herein enable higher-pressure and/or higher-temperature separations. In addition, using the graphene oxide-containing membranes described herein enable the use of smaller distillation columns, saving on both capital expenditures and operating expenditures.

The present disclosure also provides methods for producing high purity products, such as 95-99.9 mol % MeOH. In region 5 of FIG. 3, a membrane separation process can be used to increase the concentration of a fluid component to close to 100 mol %. Accordingly, the present disclosure provides a method of concentrating a first fluid component in a first fluid mixture, the first fluid mixture comprising the first fluid component at a first concentration and a second fluid component, wherein the method comprises: distilling the first fluid mixture through a first distillation column to produce a second fluid mixture having the first fluid component at a second concentration, the second concentration being greater than the first concentration and is at least 90 mol %, and feeding the second fluid mixture through a membrane system comprising at least two graphene oxide-containing membranes to produce a third fluid mixture having the first fluid component at a third concentration that is greater than the second concentration.

In some embodiments, the first concentration can be about 1.0 mol %, about 1.5 mol %, about 2.0 mol %, about 2.5 mol %, about 3.0 mol %, about 3.5 mol %, about 4.0 mol %, about 4.5 mol %, about 5.0 mol %, about 5.5 mol %, about 6.0 mol %, about 6.5 mol %, about 7.0 mol %, about 7.5 mol %, about 8.0 mol %, about 8.5 mol %, about 9.0 mol %, about 9.5 mol %, about 10.0 mol %, about 11.0 mol %, about 12 mol %, about 13 mol %, about 14 mol %, about 15 mol %, about 16 mol %, about 17 mol %, about 18 mol %, about 19 mol %, about 20.0 mol %, about 25 mol %, about 30 mol %, about 35 mol %, about 40 mol %, about 45 mol %, about 50 mol %, about 55 mol %, about 60 mol %, about 65 mol %, about 70 mol %, about 75 mol %, or about 80 mol % less than the second concentration.

Combinations of the above-referenced numbers to provide ranges for the first concentration are also possible. For example, the first concentration can be about 1.0 mol % to about 80.0 mol %, about 1.0 mol % to about 60.0 mol %, about 1.0 mol % to about 20.0 mol %, about 2.0 mol % to about 80.0 mol %, about 2.0 mol % to about 60.0 mol %, about 2.0 mol % to about 20.0 mol %, about 5 mol % to about 80 mol %, about 5 mol % to about 60 mol %, about 5 mol % to about 18 mol %, or about 5 mol % to about 15 mol % less than the second concentration.

In some embodiment, the second concentration is at least about 91 mol %, at least about 92 mol %, at least about 93 mol %, at least about 94 mol %, or at least about 95 mol %. In some embodiments, the second concentration is no more than about 98%, no more than about 97%, no more than about 96%, or no more than about 95%.

Combinations of the above-referenced numbers to provide ranges for the second concentration are also possible. For example, the second concentration can be about 91 mol % to about 98 mol %, about 92 mol % to about 98 mol %, about 93 mol % to about 98 mol %, about 94 mol % to about 98 mol %, or about 95 mol % to about 98 mol %.

The third concentration can be at least about 91 mol %, at least about 92 mol %, at least about 93 mol %, at least about 94 mol %, at least about 95 mol %, at least about 96 mol %, at least about 97 mol %, at least about 98 mol %, at least about 99 mol %, or about 100 mol %.

Combinations of the above-referenced numbers to provide ranges for the third concentration are also possible. For example, the third concentration can be about 91 mol % to about 100 mol %, about 92 mol % to about 100 mol %, about 93 mol % to about 100 mol %, about 94 mol % to about 100 mol %, about 95 mol % to about 100 mol %, about 96 mol % to about 100 mol %, about 97 mol % to about 100 mol %, or about 98 mol % to about 100 mol %.

The osmotic pressure required to preferentially drive a species through a selective membrane is given by Equation VII:

$$\prod = \frac{-RT}{V} \ln(\gamma_C x_C / \gamma_P x_P).$$

Equation VII and available data can be used to design the membrane system. The osmotic pressure can be estimated and a membrane can be selected such that the osmotic pressure is not impractically large.

In some embodiments, each graphene oxide-containing membrane can experience an osmotic pressure of less than about 2,000 psi, less than about 1,500 psi, less than about 1,000 psi, less than about 900 psi, less than about 800 psi, less than about 700 psi, less than about 600 psi, or less than about 500 psi. In some embodiments, each graphene oxide-containing membrane can experience an osmotic pressure of at least about 100 psi, at least about 200 psi, at least about 300 psi, at least about 400 psi, or at least about 500 psi.

Combinations of the above-referenced numbers to provide ranges for the osmotic pressure are also possible. For example, the osmotic pressure can be about 100 psi to about 2,000 psi, about 100 psi to about 1,000 psi, about 200 psi to about 900 psi, or about 200 psi to 800 psi.

In some embodiments, the first fluid component preferentially passes through to the permeate side of each of the graphene oxide-containing membrane as compared to the second fluid component, and the third fluid mixture is produced on a permeate side of each membrane.

As the second fluid mixture is fed through the membrane system, a fourth fluid mixture is produced on the concentrate side of each of the graphene oxide-containing membrane. The fourth fluid mixture can have the first fluid component at a fourth concentration that is less than the second concentration. In some embodiments, the method can further include distilling the fourth fluid mixture through the first distillation column.

In some embodiments where the first fluid component preferentially passes through to the permeate side of each membrane, each of the at least two graphene oxide-containing membranes has a rejection rate for the second fluid component of not more than $r_1$ or $r_2$, whichever is less, as calculated by:

$$r1 = 1 - \left(1 - \frac{\gamma_c x_c}{\gamma_{p,final} \exp\left(\frac{-RT}{P_{max}\overline{V}}\right)}\right) \bigg/ (1 - \gamma_c x_c), \quad \text{(Equation V)}$$

and $$r2 = 1 - \left(1 - \frac{\gamma_f x_f}{\gamma_{p,initial} \exp\left(\frac{-RT}{P_{max}\overline{V}}\right)}\right) \bigg/ (1 - \gamma_f x_f), \quad \text{(Equation VI)}$$

wherein:

c denotes the concentrate side of each membrane;

p denotes the permeate side of each membrane;

$\overline{V}$ is the partial molar volume of the first fluid component on the permeate side of each membrane;

$\gamma_{p, initial}$ is the activity coefficient of the first fluid component on the permeate side when the feed (i.e., the second fluid mixture) first enters the membrane system;

$\gamma_{p, final}$ is the activity coefficient of the first fluid component on the permeate side when the concentrate (i.e., the fourth fluid mixture) exits the membrane system;

$\gamma_c$ is the activity coefficient of the first fluid component in the fourth fluid mixture;

$\gamma_f$ is the activity coefficient of the first fluid component in the second fluid mixture;

$\chi_c$ is the molar fraction of the first fluid component in the fourth fluid mixture;

$\chi_f$ is the molar fraction of the first fluid component in the second fluid mixture;

R is the ideal gas constant;

T is temperature; and $P_{max}$ is the maximum practical osmotic pressure.

In some embodiments, the second fluid mixture can be fed through the membrane system without being cooled.

In some embodiments, the first fluid mixture comprises methanol and water, methanol being the first fluid component. In some embodiments, the first fluid mixture consists essentially of methanol and water. The method disclosed herein can be used to produce methanol at close to 100 mol % purity. As shown in the McCabe-Thiele diagram in FIG. 9, distillation gets much less efficient by 95 mol % (i.e., 97.1 wt %) MeOH. Assuming a final concentration of 99.8 mol % for MeOH, the rejection rate is about 96% for water and the osmotic pressure is about 489 psi at 60° C. The method described herein is exemplified in FIG. 11, which is a schematic diagram showing a process for concentrating methanol.

In some embodiments, the first fluid mixture comprises ethylene benzene, diethylbenzene, and benzene, ethylene benzene being the first fluid component. In some embodiments, the first fluid mixture consists essentially of ethylene benzene, diethylbenzene, and benzene.

In some embodiments, the first fluid mixture comprises styrene, ethyl benzene, benzene, and toluene, styrene being the first fluid component. In some embodiments, the first fluid mixture consists essentially of styrene, ethyl benzene, benzene, and toluene.

In some embodiments, the first fluid mixture comprises cumene hydroperoxide, cumene, phenol, and an organic acid, cumene hydroperoxide being the first fluid component. In some embodiments, the first fluid mixture consists essentially of cumene hydroperoxide, cumene, phenol, and an organic acid.

In some embodiments, the first fluid mixture comprises acetic acid and water, the acetic acid being the first fluid component. In some embodiments, the first fluid mixture consists essentially of acetic acid and water.

In any aspect of the present disclosure, two or more membrane systems can work together in series. For example, a first concentrated fluid mixture can be produced from the first membrane system, which can then be fed through a second membrane system to produce a second concentrated fluid mixture. Assuming that the first membrane system has a rejection rate of $r_a$ and the second membrane system has a rejection rate of $r_b$, the effective rejection rate would at most equal to $1-(1-r_a)*(1-r_b)$.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The terms "substantially", "approximately," and "about" used throughout this Specification and the claims generally mean plus or minus 10% of the value stated, e.g., about 100 would include 90 to 110.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "azeotropic concentration" refers to the concentration of a fluid component in an azeotrope.

As used herein, the term "breaking an azeotrope" or "break an azeoptrope" refers to a process where the concentration of a fluid component in a fluid mixture is increased from less than the azeotropic concentration to greater than the azeotropic concentration. In some embodiments, the fluid mixture is an azeotrope. In some embodiments, the fluid mixture is a near azeotrope.

As used herein, the term "near azeotrope" refers to a fluid mixture of two or more fluid components in which the relative volatility of the components is so close as to make distillation impractical. This is generally considered to occur when the relative volatility between the components to be separated is below 1.10.

As used herein, "wt %" refers to weight percent.
As used herein, "mol %" refers to molar percent.
As used herein, the term "consist essentially of" refers to fluid mixtures that include no more than 5 mol % impurities. In some embodiments, the fluid mixture includes no more than 4 mol %, no more than 3 mol %, no more than 2 mol %, or no more than 1 mol % impurities.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

EXAMPLES

Example 1. Concentrating HCl from a HCl-Water Mixture

The solution is initially considered to be ideal (gamma's=1) and fully ionized to hydronium and chloride. For an example feed of 8 wt % HCl, the mole fraction of water is equal to 0.781. This translates to an osmotic pressure against pure water ($x_p$=1) of 6200 psi—much too large for practical design. However, bringing $x_p$ much closer to $x_c$, much more reasonable pressures can be achieved.

Figure 5:
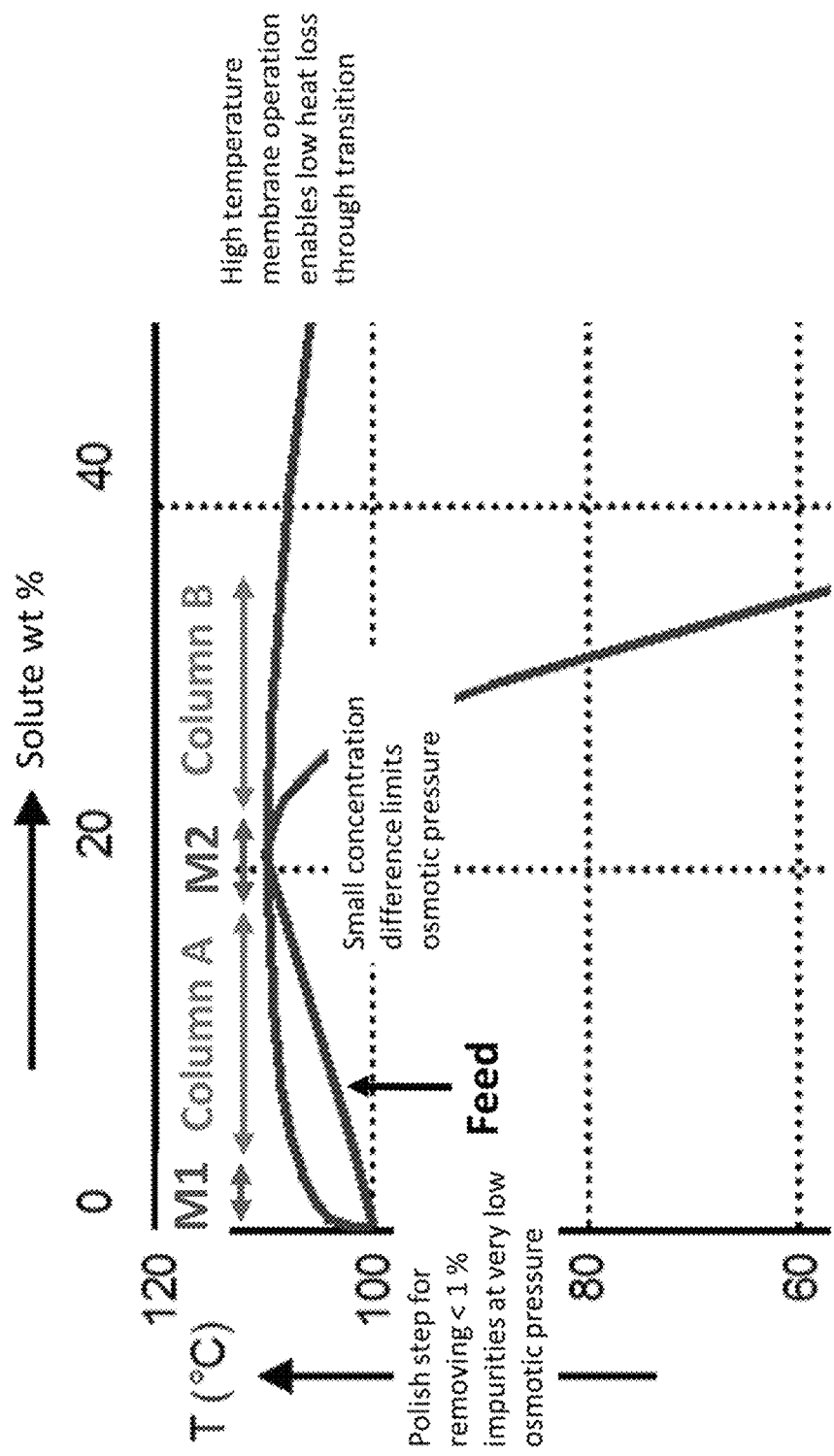
FIG. 5 is a portion of a two-component phase diagram and illustrates the combined use of distillation and membrane separation to concentrate a fluid component in the two-component system, according to some embodiments. M1 denotes a first membrane system, and M2 denotes a second membrane system.

The phase diagram (FIG. 5) indicates that the azeotrope should be crossed around 20.2 wt %. Using a membrane modeling software, systems can be designed with different membrane rejections to achieve feasible pressures. Membranes with different rejections and areas are modeled and their outputs are transferred into a set of mass balances for the diagram in FIG. 8.

Figure 7A:
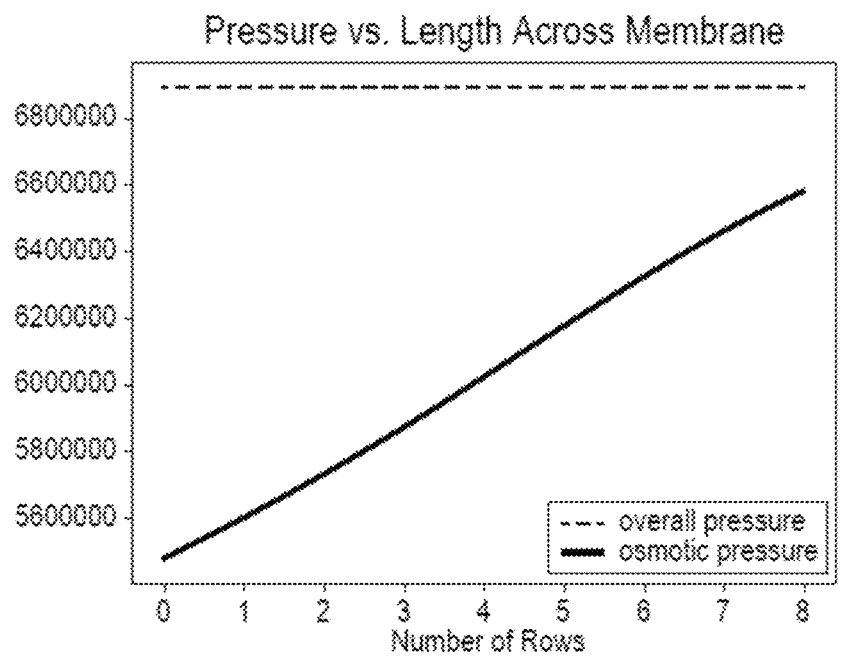
FIGS. 7A-7C are graphs showing design considerations for concentrating HCl in an HCl/water mixture, according to some embodiments.
Figure 7B:
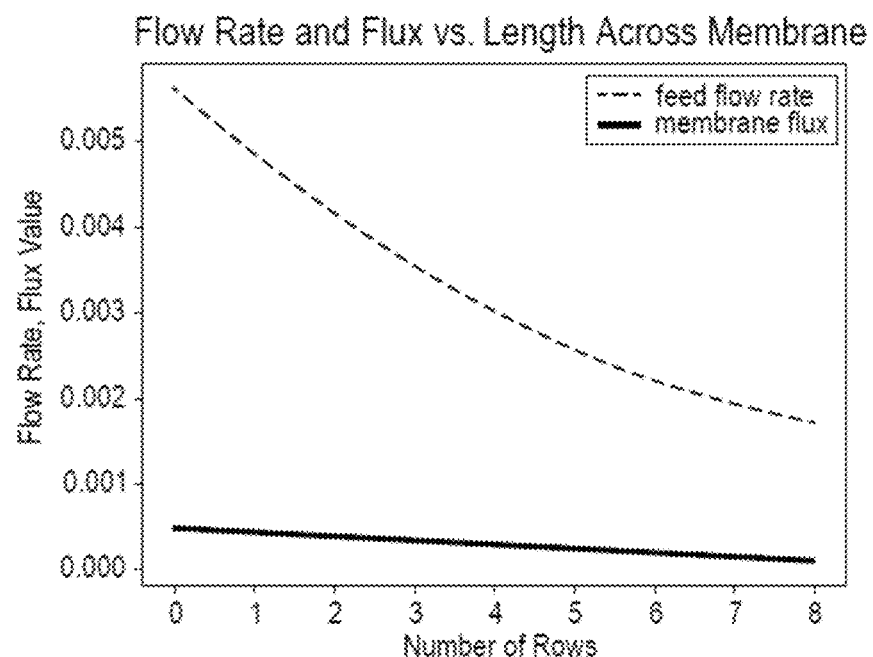
Figure 7C:
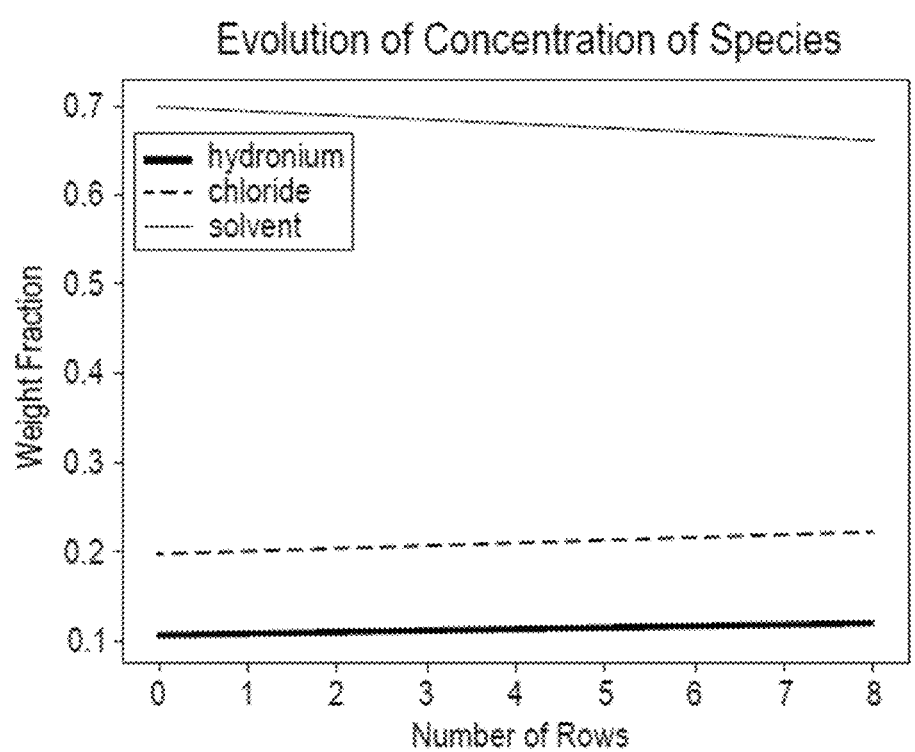

Along the discretized flow path, the compositions of the feed and permeate elements are computed as well as the flux through the membrane. The membrane area is envisioned to be 8 m long in flow path to represent 8×1 m long elements in series. As the feed moves between the two modeled membrane sheets, its properties change as shown here (this is the r=0.10 case; further details below). The computations produce the graphs in FIGS. 7A-7C that show design considerations for concentrating HCl in a HCl-water mixture, according to some embodiments.

Using the same assumptions of solution ideality, fixed partial molar volume, several different concentrates and permeates can be produced for conceptual illustration, as shown in Table 16. The membranes in this design are given permeabilities of 0.005 gallons/(ft$^2$ day (psi of driving pressure–osmotic pressure)). For a driving pressure of 1000 psi, temperature of 110° C., and a membrane system feed flow rate of 123000 kg/hr and 20 wt % HCl.

TABLE 16

| Rejection Rate | Total Membrane Area (m$^2$) | Concentrate HCl (wt %) | Permeate HCl (wt %) |
| --- | --- | --- | --- |
| 0.06 | 12000 | 21.3 | 19.5 |
| 0.08 | 20000 | 21.9 | 19.3 |
| 0.1 | 40000 | 22.0 | 19.0 |

As can been seen in Table 16, the higher the membrane rejection rate, the greater the difference in permeate and concentrate rejections can be achieved. However, the higher rejection rate means greater osmotic pressure and thus more membrane area is needed for a fixed driving pressure. Although pressure was fixed here, it could be varied for fixed membrane area to much the same effect. Any pressure in excess of the osmotic pressure is approximately related to the area needed by the permeability of the membrane.

Table 17 highlights design tradeoffs which occur at the system level as the membrane design is varied.

TABLE 17

Design tradeoffs

| Parameter | Pros | Cons |
| --- | --- | --- |
| Larger Membrane system | Smaller Column B | More reflux to column A |
| Lower membrane rejection | Less osmotic pressure, fewer membranes need | Larger column A and smaller column B |
| Minimal permeate for recycle | Less reflux to column A, smaller membrane system | Larger column B |
| Increased driving pressure for membranes | Smaller columns and/or membrane system | Higher pump and pressure vessel capital expenditure |

It should be noted that the assumption of solution ideality will underestimate the osmotic pressure. This can be partially compensated for by the choice of a fairly low permeability value. This can be compensated for by choice of lower rejection or higher operating pressure or both.

FIG. 8 gives examples of the mass balances for an 8% feed and 23700 kg/hr feed to a first distillation column. The mass balances are nearly converged with the membrane system for r=0.1 in Table 16.

Example 2. Concentrating MeOH from a MeOH-Water Mixture

Figure 9:
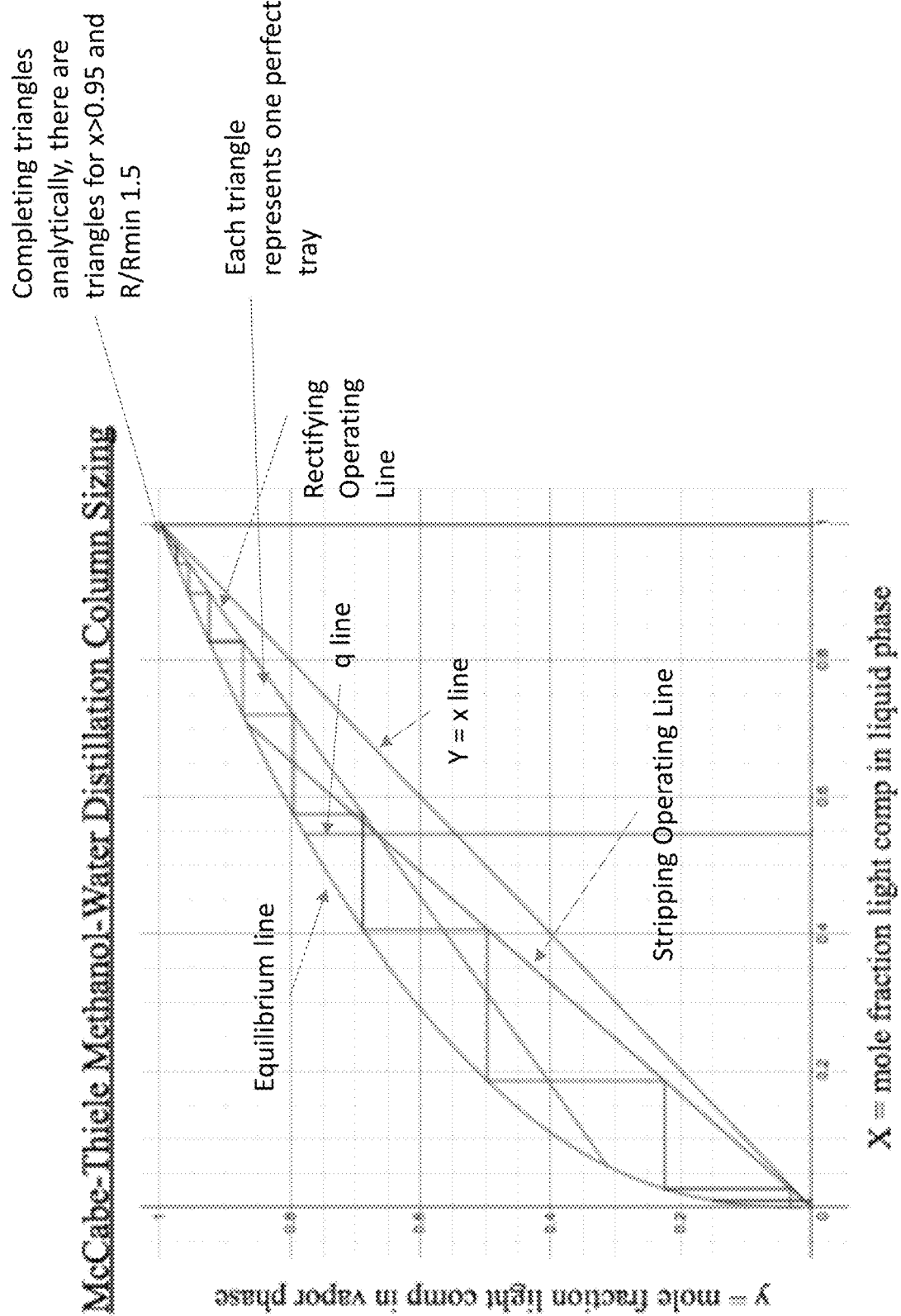
FIG. 9 is a phase diagram showing McCabe-Thiele methanol-water distillation column sizing.

FIG. 9 is a phase diagram showing McCabe-Thiele methanol-water distillation column sizing. Each triangle represents one perfect tray. The distillation column is least efficient at high levels of methanol, where the triangles are very small. The tray density increases as the wt % MeOH approaches 1.

Minimum reflux ratio ($R_{min}$) is about 1: (a) >50% of fluid must go back to top of column; and (b) impacts recovery ratio but not membrane rejection because this a methanol permeating/water rejecting membrane.

Figure 10A:
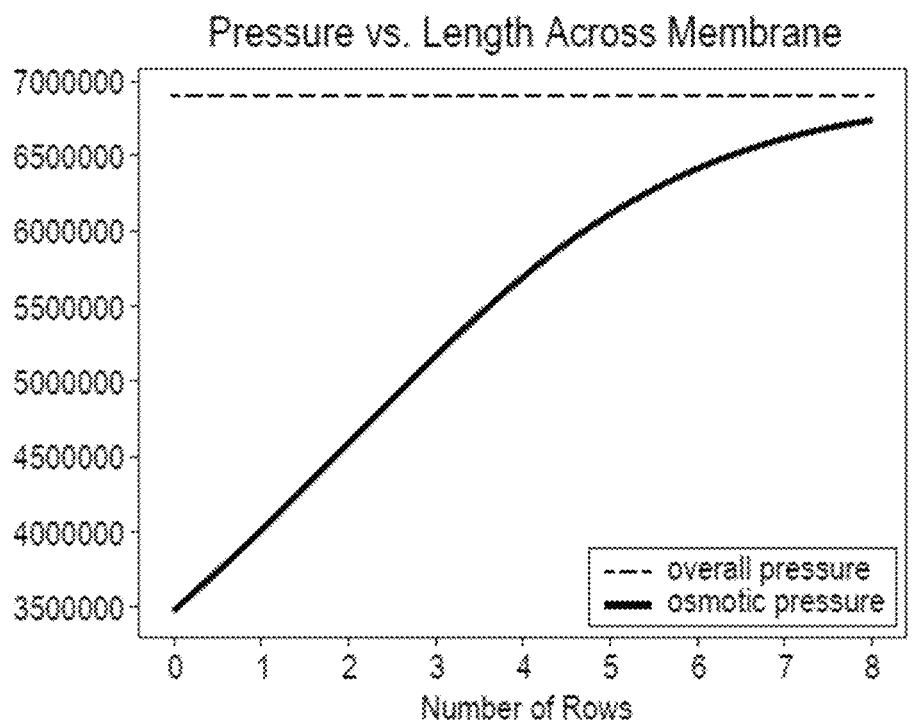
FIGS. 10A-10C are graphs showing design considerations for concentrating MeOH in a MeOH-water mixture, according to some embodiments.
Figure 10B:
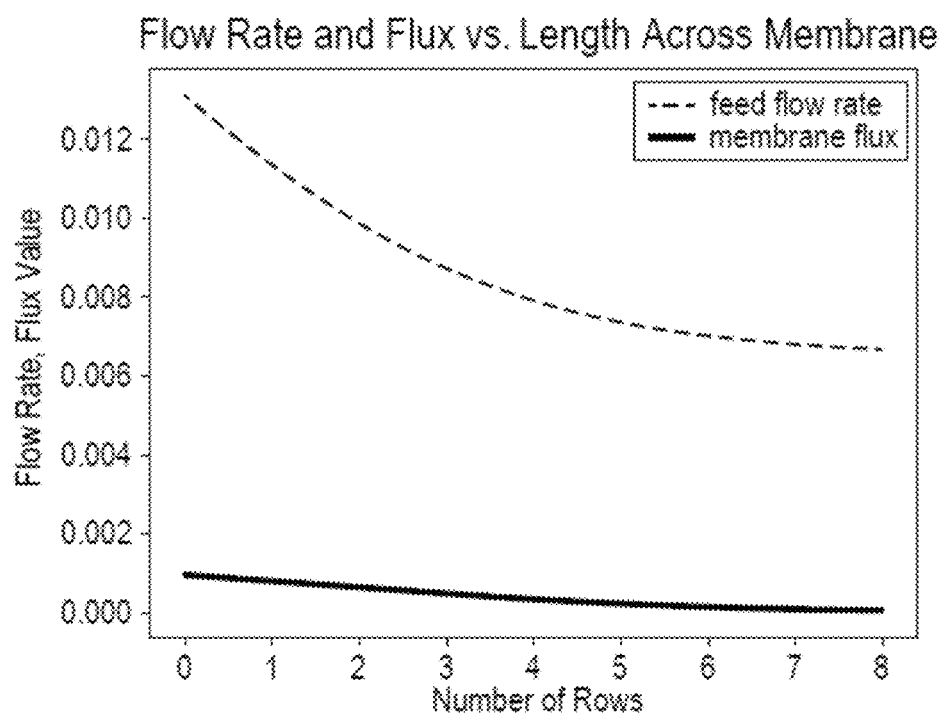
Figure 10C:
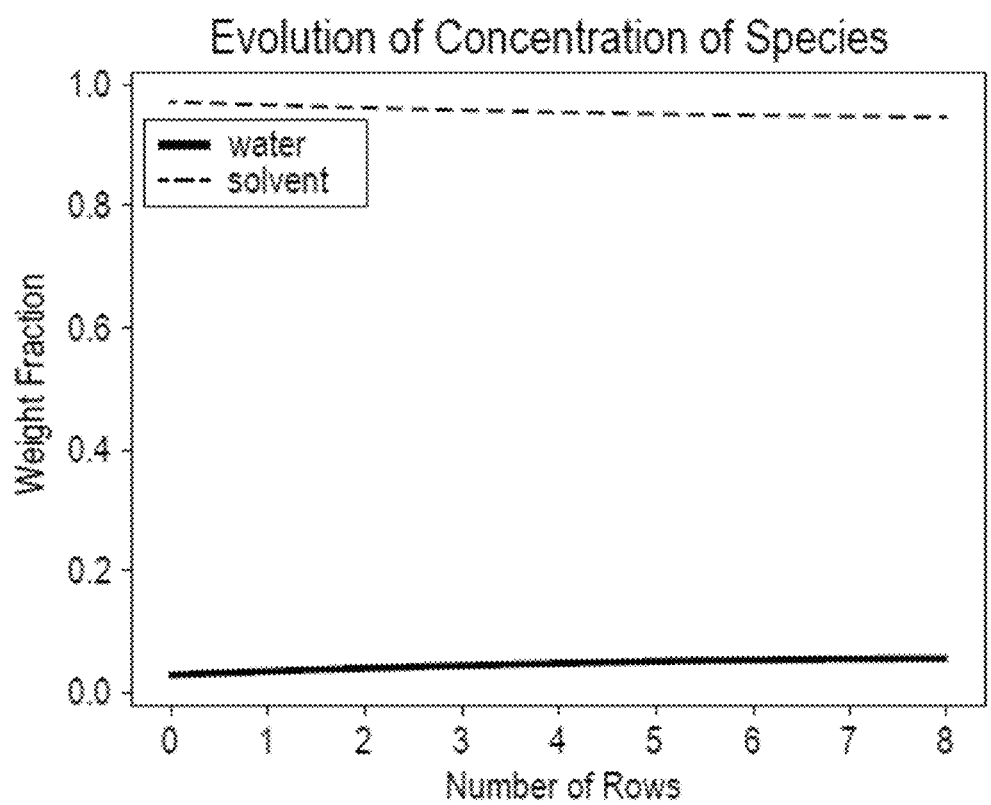
Figure 11:
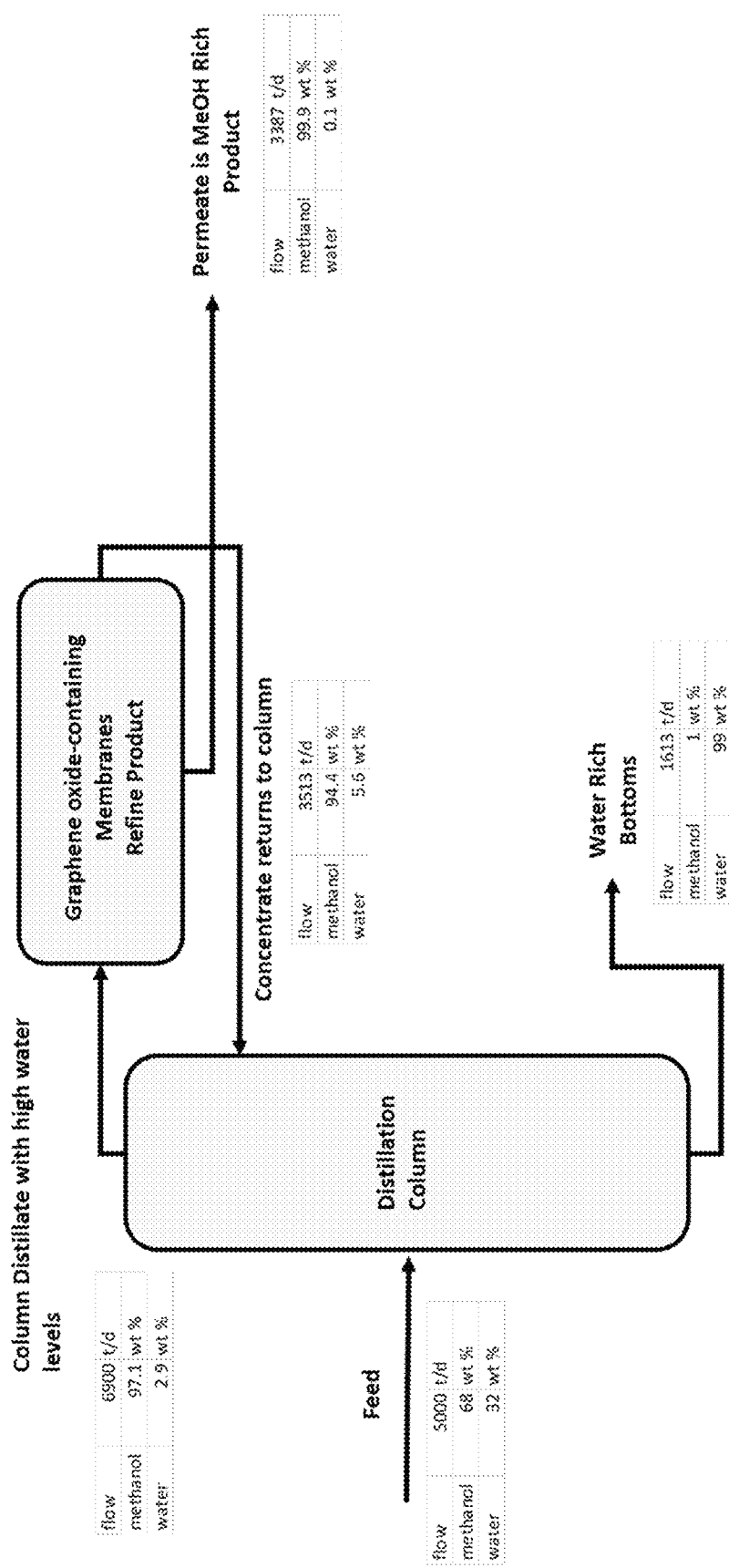
FIG. 11 is a schematic diagram showing a process flow for concentrating MeOH in a MeOH-water mixture, according to some embodiments.
Figure 12:
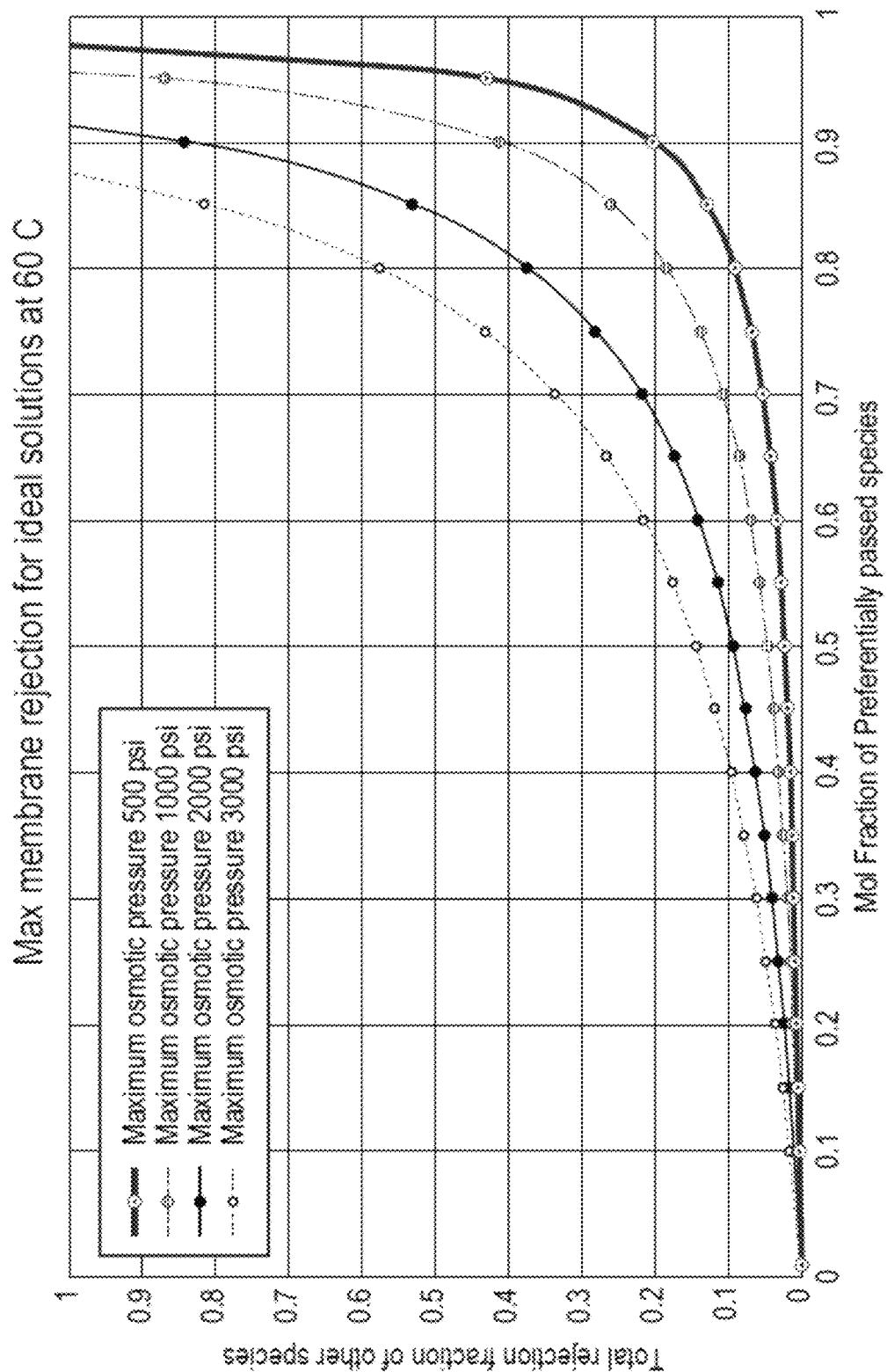
FIG. 12 is a graph showing maximum membrane rejection for ideal solutions at 60° C.
Figure 13:
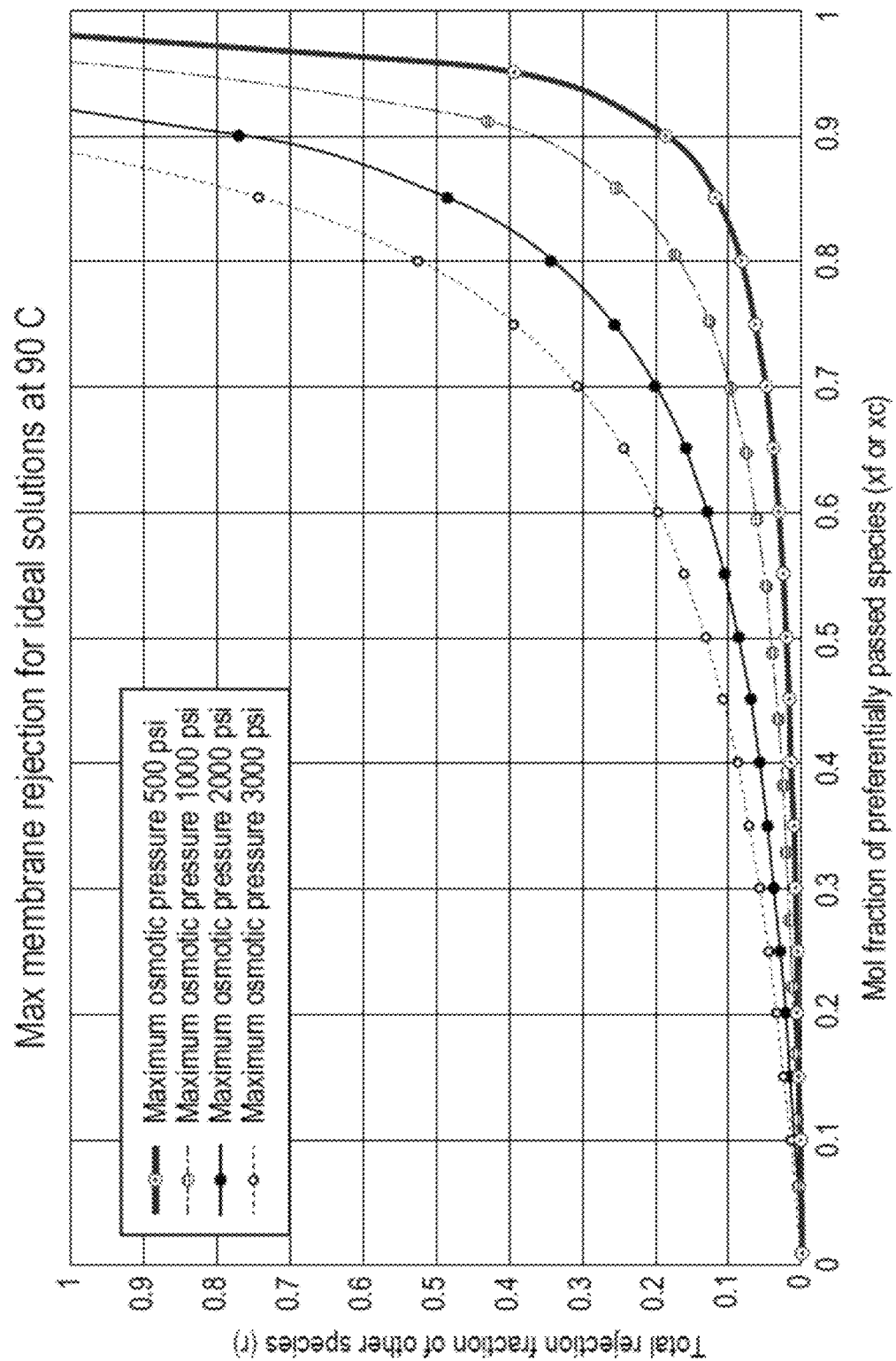
FIG. 13 is a graph showing maximum membrane rejection for ideal solutions at 90° C.

To support the design case outlined in FIG. 11, a membrane simulation and mass balance calculations were performed. By iteratively repeating the membrane simulation (varying the membrane rejection to ensure correct >99.86 wt % MeOH product) with a feed of the column distillate composition and then updating the mass balances, convergence was reached for the numbers. Here are some of the results of the membrane simulation. For simplicity (other pressures could be used), the pressure was set to 1000 psi and 40000 square meters of membrane (in combination with a permeability of 0.005 gallons/(ft$^2$ day (psi of driving pressure–osmotic pressure) was used. The computations produce the graphs in FIGS. 10A-10C that show design considerations for concentrating MeOH in a MeOH-water mixture, according to some embodiments.

The system thus designed would eliminate ~4 ideal trays (many more practical trays off the sizing of the column). Additionally, it could increase the throughput of a column with a fixed number of trays. To illustrate this conceptually, here is a relationship between the number of ideal trays and recovery ratio for the column designed with any membrane modifications (for a distillate of 99.8 mol % methanol).

TABLE 17

| $R/R_{min}$ value | N (FUG method) | N (McCabe-Thiele Graph) |
| --- | --- | --- |
| 1.2 | 28.85532926 | 30 |
| 1.5 | 24.11423895 | 20 |
| 2.5 | 17.9812553 | 13.33333333 |

In Table 17, R stands for reflux. The amount of reflux is measured in multiples of $R_{min}$. The distillation column is more productive when R is lower. FUG method stands for Fenske-Underwood-Gilliland method, which is used for empirically sizing distillation columns.

What is claimed is:

1. A method of breaking an azeotrope comprising a first fluid component and a second fluid component, the first fluid component being hydrochloric acid and the second fluid component being water; the azeotrope being characterized by an azeotropic concentration of the first fluid component, wherein the method comprises:

feeding a first fluid mixture through a membrane system comprising two graphene oxide-containing membranes, the two graphene oxide-containing membranes defining a fluid feed channel, the first fluid mixture comprising the first fluid component at a first concentration and the second fluid component, subjecting each graphene oxide-containing membrane to a pumping pressure of 200 psi to 1000 psi, wherein the first concentration is about 0.1 mol % to about 10 mol % less than the azeotropic concentration, whereby at least a portion of the first fluid mixture moves from the fluid feed channel through the two graphene oxide-containing membranes to produce a second fluid mixture having a second concentration of the first fluid component greater than the azeotropic concentration.

2. The method of claim 1, wherein the second concentration is about 0.1 mol % to about 10 mol % greater than the azeotropic concentration.

3. The method of claim 1, wherein:

the second fluid component preferentially passes through each graphene oxide-containing membrane as compared to the first fluid component; and the second fluid mixture is produced on a concentrate side of each graphene oxide-containing membrane.

4. The method of claim 1, wherein each of the graphene oxide-containing membranes comprises a plurality of graphene oxide sheets.

5. The method of claim 4, wherein each of the graphene oxide sheets is coupled to an adjacent graphene oxide sheet via a chemical linker.

6. A method of concentrating a first fluid component in a first fluid mixture, the first fluid mixture comprising the first fluid component at a first concentration and a second fluid component, wherein the first fluid component is hydrochloric acid, the second fluid component is water, and the method comprises:

distilling the first fluid mixture through a first distillation column to produce a second fluid mixture having the first fluid component at a second concentration, the second concentration being greater than the first concentration and less than an azeotropic concentration of the first fluid component in the second fluid mixture, feeding the second fluid mixture through a membrane system comprising two graphene oxide-containing membranes, the two graphene oxide-containing membranes defining a fluid feed channel, and subjecting each graphene oxide-containing membrane to a pumping pressure of 200 psi to 1000 psi, whereby at least a portion of the second fluid mixture moves from the fluid feed channel through the two graphene oxide-containing membranes to produce a third fluid mixture having the first fluid component at a third concentration that is greater than the azeotropic concentration.

7. The method of claim 6, further comprising distilling the third fluid mixture through a second distillation column to produce a fourth fluid mixture having the first fluid component at a fourth concentration that is greater than the third concentration.

8. The method of claim 6, wherein the third fluid mixture is produced on a concentrate side of each graphene oxide-containing membrane; and the feeding step produces a fifth fluid mixture on a permeate side of each graphene oxide-containing membrane, the fifth fluid mixture having the first fluid component at a fifth concentration that is less than the second concentration, the method further comprising distilling the fifth fluid mixture through the first distillation column.

9. The method of claim 6, wherein the second fluid mixture is fed through the membrane system without being cooled.

10. The method of claim 1, wherein the two graphene oxide-containing membranes are parallel or substantially parallel to each other.

* * * * *